US011355123B2

(12) United States Patent
Trim et al.

(10) Patent No.: US 11,355,123 B2
(45) Date of Patent: Jun. 7, 2022

(54) NETWORK DATA ALIGNING

(71) Applicant: International Business Machines Corporation, Armonk, NY (US)

(72) Inventors: Craig M. Trim, Glendale, CA (US); Lakisha R. Hall, Bethesda, MD (US); Gandhi Sivakumar, Melbourne (AU); Kushal Patel, Pune (IN); Sarvesh S. Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 16/687,809

(22) Filed: Nov. 19, 2019

(65) Prior Publication Data

US 2021/0151056 A1 May 20, 2021

(51) Int. Cl.
*G10L 15/00* (2013.01)
*G10L 15/30* (2013.01)
*G06F 9/455* (2018.01)
*G06N 3/00* (2006.01)
*G06F 16/248* (2019.01)
*G06N 5/04* (2006.01)
*G06F 16/21* (2019.01)
*G10L 15/18* (2013.01)
*H04L 47/70* (2022.01)
(Continued)

(52) U.S. Cl.
CPC .............. *G10L 15/30* (2013.01); *G06F 9/455* (2013.01); *G06F 16/212* (2019.01); *G06F 16/248* (2019.01); *G06N 3/006* (2013.01); *G06N 5/04* (2013.01); *G10L 15/1815* (2013.01); *G10L 15/22* (2013.01); *H04L 47/821* (2013.01); *G06F 9/45558* (2013.01); *G06F 2009/45595* (2013.01); *G10L 2015/223* (2013.01); *H04L 67/10* (2013.01)

(58) Field of Classification Search
CPC .......... G10L 15/22; G10L 15/24; G06F 3/167
See application file for complete search history.

(56) References Cited

U.S. PATENT DOCUMENTS 10,178,218 B1   1/2019  Vadodaria
11,037,572 B1 * 6/2021  Beal ........................ G10L 17/00
(Continued)

OTHER PUBLICATIONS

Mell, et al. "*The NIST Definition of Cloud Computing*", NIST Special Publication 800-145, Sep. 2011, Gaithersburg, MD, 7 pgs.
(Continued)

*Primary Examiner* — Daniel Abebe
(74) *Attorney, Agent, or Firm* — Brian Restauro; George S. Blasiak; Heslin Rothenberg Farley & Mesiti PC

(57) ABSTRACT

Methods, computer program products, and systems are presented. The method, computer program products, and systems can include for instance: obtaining sensor output data from a user, wherein the sensor output data from the user includes voice data of the user; generating, during an interactive voice response session, vocal response data for presentment by a virtual agent to the user in response to the voice data, wherein the generating includes performing data access queries on one or more storage system; and prioritizing certain asset data of the one or more storage system, wherein the prioritizing is performed in dependence on data of the sensor output data.

25 Claims, 13 Drawing Sheets

(51) Int. Cl.
    *G10L 15/22*     (2006.01)
    *H04L 67/10*     (2022.01)

(56) References Cited

U.S. PATENT DOCUMENTS

| 2016/0034158 A1 | 2/2016 | Livesay et al. |
| 2017/0033834 A1 | 2/2017 | Gross et al. |
| 2021/0118440 A1* | 4/2021 | Peng .................. G06F 9/4881 |
| 2021/0216589 A1* | 7/2021 | Ikenaga ............... G06F 3/16 |

OTHER PUBLICATIONS

IEEE, "*Machine Learning for a 5G Future*" ITUKaleidoscope, Santa Fe 2018, Nov. 26-28, 2018.

R. Prasad (editor), "*5G Outlook—Innovations and Applications*" River Publishers Series Communications, ISBN 978-87-93379-78, 2017-2018.

Anonymously, "*Empathetic and Mindful Virtual Assistant*" IP.Com—IPCOM000256377D, Nov. 26, 2018.

Anonymously, "*Action Prediction from Conversations*" IP.Com—IPCOM000253298D, Mar. 20, 2018.

Anonymously, "*Automatic Creation of Communication Channels around Detected Events*" IP.Com—IPCOM000252373D, Jan. 5, 2018.

Anonymously, "*Crowdsourced Market Research and Survey Completion Using Intelligent Conversational Assistants*" IP.Com—IPCOM000256850D, Jan. 4, 2019.

T. Saboorian, "*Network Slicing and 3GPP Service and Systems Aspects (SA) Standard*", IEEE Softwarization, https://sdn.ieee.org/newsletter/december-2017/network-slicing-and-3gpp-service-and-systems-aspects-sa-standard, Dec. 2017.

K. Sparks, "*5G Network Slicing Whitepaper*", FCC Technological Advisory Council 5G IoT Working Group, https://transition.fcc.gov/bureaus/oet/tac/tacdocs/reports/2018/5G-Network-Slicing-Whitepaper-Finalv80.pdf.

3rd Generation Partnership Project: Technical Specification Group Services and System Aspects: Management and Orchestration Provisioning (Release16) 3GPP TS 28.531 V16.2.0; (Jun. 2019).

* cited by examiner

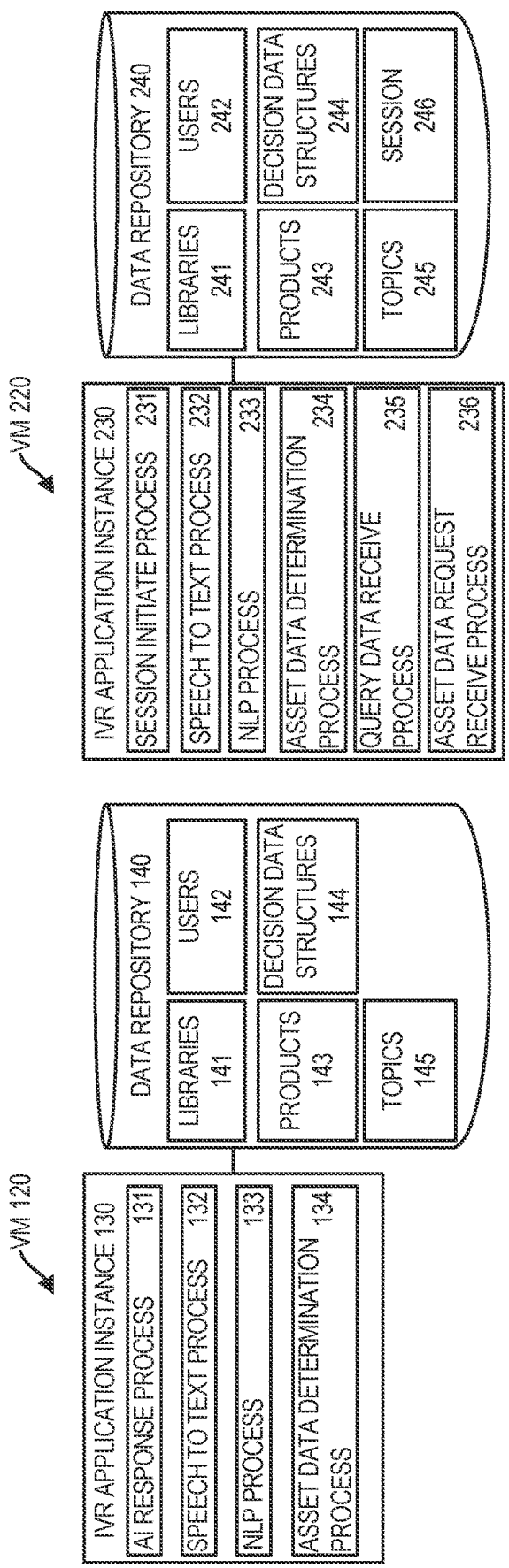

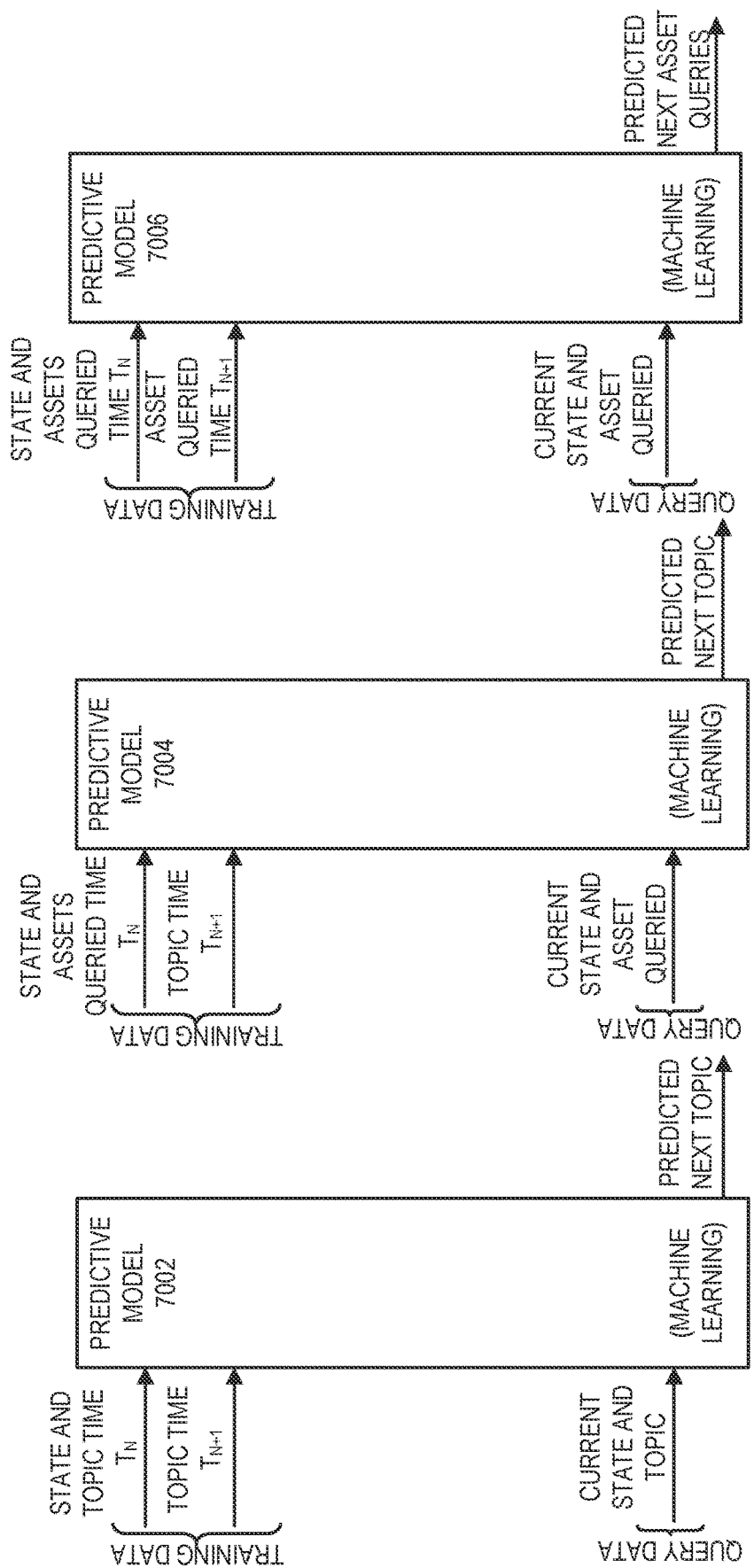

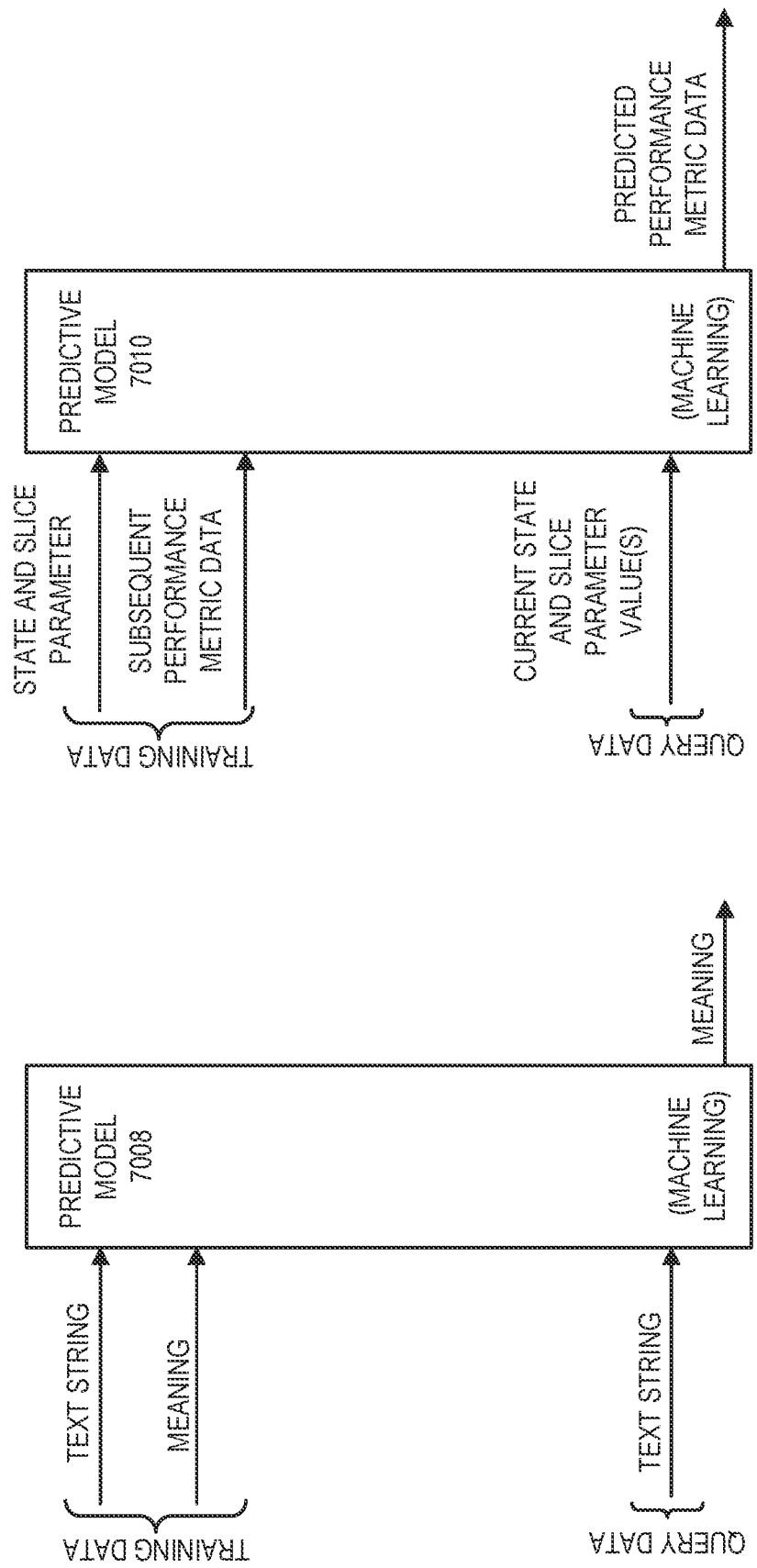

NETWORK DATA ALIGNING

FIELD

Embodiments herein relate to network based data communications wherein data can be transmitted and/or received over a network.

BACKGROUND

A network service can include an application running at the network application layer and above, that provides data storage, manipulation, presentation, communication or other capability which is often implemented using a client-server architecture based on application layer network protocols. Each network service is usually provided by a server component running on one or more computers and accessed via a network by client components running on other devices. However, client and server components may both run on the same machine. In addition, a dedicated server computer may offer multiple network services concurrently.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

Network function virtualization (NFV) refers to a network architecture that uses the technologies of IT virtualization to virtualize entire classes of network node functions into building blocks that may connect, or chain together, to create communication services. NFV relies upon, but differs from, traditional server-virtualization techniques, such as those used in enterprise IT. A virtualized network function, or VNF, may consist of one or more virtual machines running different software and processes, on top of standard high-volume servers, switches and storage devices, or even cloud computing infrastructure, instead of having custom hardware appliances for each network function.

SUMMARY

Shortcomings of the prior art are overcome, and additional advantages are provided, through the provision, in one aspect, of a method. The method can include, for example: obtaining output data from a user equipment device associated to a user, wherein the output data from the user equipment device includes voice data of the user; generating, during an interactive voice response session, vocal response data for presentment by a virtual agent to the user in response to the voice data, wherein the generating includes performing data access queries on one or more storage system; and prioritizing certain asset data of the one or more storage system, wherein the prioritizing is performed in dependence on data of the output data.

In another aspect, a computer program product can be provided. The computer program product can include a computer readable storage medium readable by one or more processing circuit and storing instructions for execution by one or more processor for performing a method. The method can include, for example: obtaining output data from a user equipment device associated to a user, wherein the output data from the user equipment device includes voice data of the user; generating, during an interactive voice response session, vocal response data for presentment by a virtual agent to the user in response to the voice data, wherein the generating includes performing data access queries on one or more storage system; and prioritizing certain asset data of the one or more storage system, wherein the prioritizing is performed in dependence on data of the output data.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining output data from a user equipment device associated to a user, wherein the output data from the user equipment device includes voice data of the user; generating, during an interactive voice response session, vocal response data for presentment by a virtual agent to the user in response to the voice data, wherein the generating includes performing data access queries on one or more storage system; and prioritizing certain asset data of the one or more storage system, wherein the prioritizing is performed in dependence on data of the output data.

Shortcomings of the prior art are overcome, and additional advantages are provided, through the provision, in one aspect, of a method. The method can include, for example: obtaining output data from a user equipment device of a user, wherein the output data includes voice data of the user; providing network slice selection data in dependence on data of the output data; and generating during an interactive voice response session in response to the voice data, vocal response data for presentment to the user by a virtual agent, wherein the generating includes using data traffic received over one or more network slice operating according to the network slice selection data, and wherein the generating includes performing data access queries on one or more storage system.

In another aspect, a computer program product can be provided. The computer program product can include a computer readable storage medium readable by one or more processing circuit and storing instructions for execution by one or more processor for performing a method. The method can include, for example: obtaining output data from a user equipment device of a user, wherein the output data includes voice data of the user; providing network slice selection data in dependence on data of the output data; and generating during an interactive voice response session in response to the voice data, vocal response data for presentment to the user by a virtual agent, wherein the generating includes using data traffic received over one or more network slice operating according to the network slice selection data, and wherein the generating includes performing data access queries on one or more storage system.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining output data from a user equipment device of a user, wherein the output data includes voice data of the user; providing network slice selection data in dependence on data of the output data; and generating during an interactive voice response session in response to the voice data, vocal response data for presentment to the user by a virtual agent, wherein the generating includes using data traffic received over one or more network slice operating according to the network slice selection data, and wherein the generating includes performing data access queries on one or more storage system.

Shortcomings of the prior art are overcome, and additional advantages are provided, through the provision, in one aspect, of a method. The method can include, for example: obtaining output data from a user equipment device associated to a user; and generating, during an interactive session, response data for presentment to the user in dependence on data of the output data.

Shortcomings of the prior art are overcome, and additional advantages are provided, through the provision, in one aspect, of a method. The method can include, for example: obtaining output data from a user equipment device associated to a user, and generating, during an interactive voice response session, vocal response data for presentment by a virtual agent to the user in response to the voice data.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1B depicts processes for performance by a virtual machine according to one embodiment;

FIG. 1C depicts processes for performance by a virtual machine according to one embodiment;

FIGS. 7A-7E depict predictive models for support of an IVR session according to one embodiment;

DETAILED DESCRIPTION

Figure 1A:
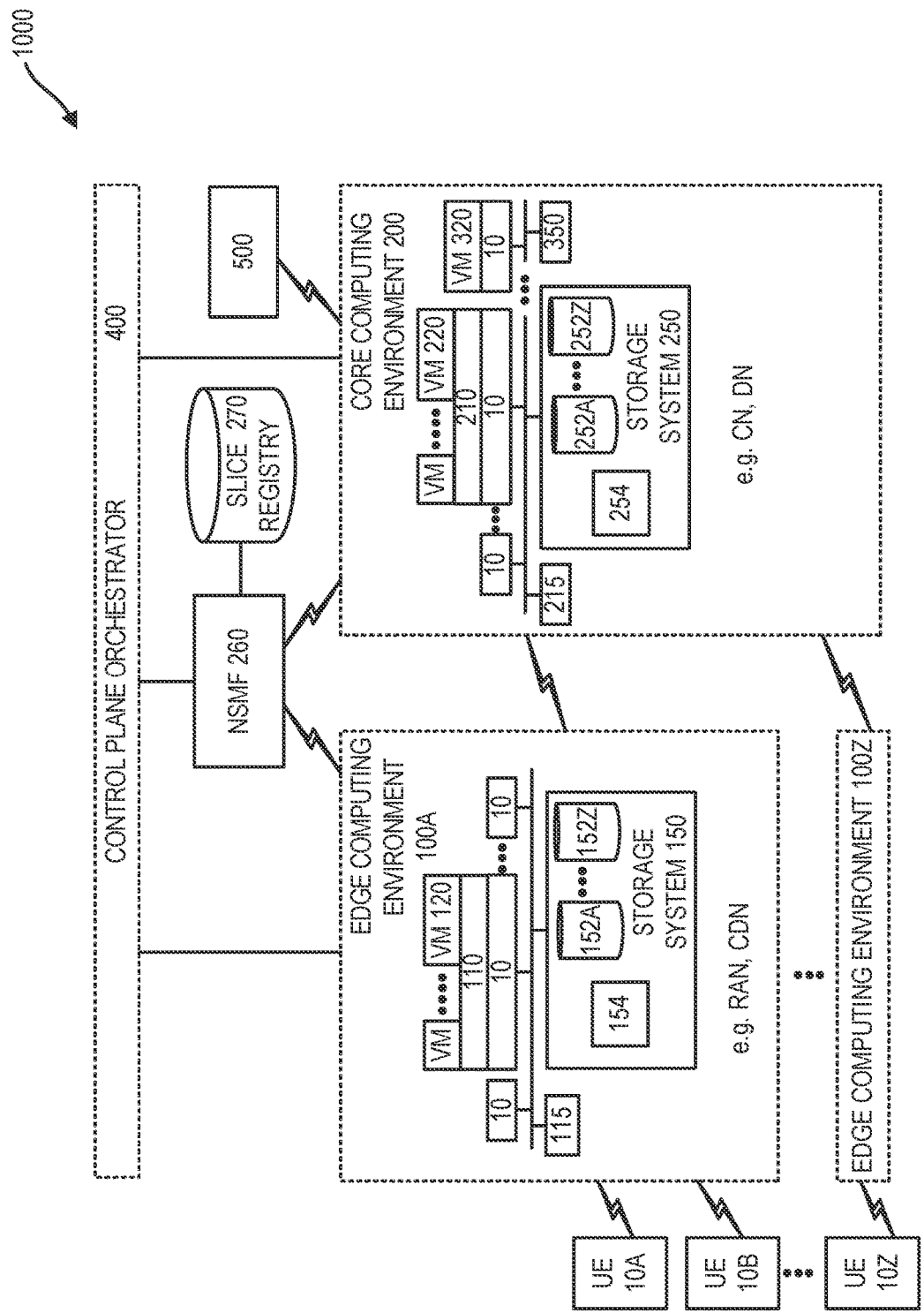
FIG. 1A depicts a system having a computing node of a core computing environment, a computing node of an edge computing environment, and a user equipment device according to one embodiment.

FIG. 1A illustrates system 1000 for providing interactive voice response (IVR) to a user. System 1000 can include one or more computing node 10 disposed in core computing environment 200, one or more computing node 10 disposed in one or more edge computing environment 100A-100Z, and user equipment (UE) devices 10A-10Z which can be computing node based devices. UE devices 10A-10Z can connect to core computing environment 200 through multiple different edge computing environments 100A-100Z.

Each of the different UE devices 10A-10Z can be associated to a different user. Regarding UE devices 10A-10Z, a UE device of UE devices 10A-10Z in one embodiment can be a computing node device provided by a client computer, e.g. a mobile device, e.g. a smartphone or tablet, a laptop, smartwatch or PC.

Referring to FIG. 1A, edge computing environment 100A can be characterized by being closer in location proximity to a UE device to which it is connected, such as UE device 10A than core computing environment 200. According to one embodiment, edge computing environment 100A can include, e.g. an access network (AN) such as a radio access network (RAN) and/or a content delivery network (CDN). According to one embodiment, core computing environment 200 can include, e.g. a mobility core network (CN) and/or a data network (DN). According to one embodiment, edge computing environment 100A (closer in proximity to a connecting UE device) can include a mobility CN and core computing environment 200 can include a DN. According to one embodiment a RAN can include various types of facilities, including small cells, masts, and dedicated systems that connect mobile users and wireless devices to a core network. RAN cells can include small cells and macro cells. Small cells can feature, e.g. Fifth Generation (5G) networks at millimeter wave frequencies according to one embodiment. To provide continuous connection, small cells can be distributed in clusters depending on where users require connection. 5G macro cells can use multiple input multiple output (MIMO) antennas that have multiple connections to send and receive more data simultaneously. According to one embodiment, core computing environment 200 can include computing nodes of one or more web hosting data center which one or more data center can include at least one single tenant data center and/or at least one multi-tenant data center. According to one embodiment, a mobility CN can comprise a mobile exchange and data network that manages mobile voice data and internet connections and to provide access to core computing environment services. Computing nodes of edge computing environment 100A, according to one embodiment, can be configured as 5G compliant compute nodes. 5G compliant compute nodes can be featured to support network function virtualization (NFV). In accordance with NFV, network functions historically provided by dedicated hardware device can be instantiated at non-dedicated computing nodes within an edge computing environment such as within a RAN, a CDN and/or a mobility CN.

Core computing environment 200 can include storage system 250 having storage devices 252A-252Z. Storage system 250 is shown, in the embodiment of FIG. 1A, as a shared storage system shared by computing nodes 10 of core computing environment 200, but computing nodes 10 can alternatively have dedicated storage. Computing nodes 10 can be provided by physical computing nodes. Storage system 250 can include storage controller 254 and storage devices 252A-252Z, which can be provided by physical storage devices. Physical storage devices of storage system 250 can include associated controllers. Storage devices 252A-252Z can be provided, e.g. by hard disks and Solid-State Storage Devices (SSDs). Storage system 250 can be in communication with certain computing nodes of computing nodes 10 of core computing environment 200 by a Storage Area Network (SAN) and/or a Network Attached Storage (NAS) link. According to one embodiment, core computing environment 200 can include fibre channel network providing communication between certain computing nodes of computing nodes 10 of core computing environment (such as the computing node 10 hosting VM 220) and storage system 250. The fibre channel network can include a physical fibre channel that runs the fibre channel protocol to define a SAN. NAS access to storage system 250 can be provided by an IP based network with core computing environment 200. Among other functions, authority 215 can manage the instantiation of virtual machines (VMs) on computing nodes 10 of core computing environment 200 and virtual networks (VNs) defined by computing nodes 10 of core computing environment 200.

According to one deployment scheme, VM 220 and VM 120 can be operated by a first enterprise and VM 320, connected to storage system 350 within core computing environment 200 can be operated by a second enterprise. The operations of VM 120 to perform an IVR session can include operations to query common enterprise assets of storage system 250 as well as operations to query third-party assets stored in storage system 350. VM 320 and its associated local storage system 350 associated and local to VM 320 can be provided in a common data center with VM 220 and its associated storage system 250 or in a data center remote and external from a data center in which VM 220 and storage system 250 are located. VMs herein such as VM 220, VM 120 and VM 320 can define virtual computing nodes. Computing nodes 10 herein can define physical computing nodes.

Edge computing environments 100A-100Z can be configured according to edge computing environment 100A. Edge computing environment 100A can include computing nodes of a radio access network (RAN), computing nodes of content delivery network (CDN), and/or computing nodes of a mobility core network (CN). Where edge computing environment 100A is provided by a RAN, computing nodes 10 of edge computing environment 100A can be provided by RAN compute nodes.

Edge computing environment 100A can include storage system 150 having storage devices 152A-152Z. Storage system 150 is shown as a shared storage system shared by certain computing nodes of computing nodes 10 of edge computing environment 100A, but computing nodes 10 can alternatively have dedicated storage. Computing nodes 10 can be provided by physical computing nodes. Storage system 150 can include storage controller 154 and storage devices 152A-152Z, which can be provided by physical storage devices. Physical storage devices of storage system 150 can include associated controllers. Storage devices 152A-152Z can be provided, e.g. by hard disks and Solid-State Storage Devices (SSDs). Storage system 150 can be in communication with certain computing nodes of computing nodes 10 of core computing environment 100A by a Storage Area Network (SAN) and/or a Network Attached Storage (NAS) link. According to one embodiment, Edge computing environment 100A can include fibre channel network providing communication between certain computing nodes of computing nodes 10 of edge computing environment 100A (such as the computing node 10 that hosts VM 120) and storage system 150. The fibre channel network can include a physical fibre channel that runs the fibre channel protocol to define a SAN. NAS access to storage system 150 can be provided by an IP based network with core computing environment 200. Among other functions, authority 115 can manage the instantiation of virtual machines on computing nodes 10 of edge computing environment 100A and virtual networks (VNs) defined by computing nodes 10 of edge computing environment 100A.

According to one embodiment, each of storage system 250 and storage system 150 can define tiers of storage. Tiered storage is an underlined principle of information lifecycle management (ILM). Tiered storage is a storage networking method where data is stored on various types of storage volumes based on performance availability and recovery requirements. In one embodiment, Tier 0 storage can be used for mission critical files. Tier 0 storage devices can be provided by SSDs which can be faster than Tier 1 storage devices, which can be faster than Tier 2 storage devices, which can be faster than Tier 3 storage devices. According to one embodiment, VM 120 can be configured so that when accessing data from storage system 250 or storage system 150, VM 120 can search for data in an order determined by the location of the storage system and the storage tiering. That is, when accessing data from a storage system, VM 120 can search for asset data in an order of storage system 150 local to VM 120 and then storage system 250 external and remote from VM 120. When accessing data from storage system 150, VM 120 can search according to an order of Tier 0, then Tier 1, then Tier 2, then Tier 3. When accessing data from storage system 250, VM 120 can search according to an order of Tier 0, then Tier 1, then Tier 2 then Tier 3.

In a further aspect, system 1000 can include social media system 500. Social media system 500 can include a collection of files, including for example, HTML files, CSS files, image files, and JavaScript files. Social media system 500 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that have minimal or no social network attributes. A messaging system can be provided by a short message system (SMS) text message delivery service of a mobile phone cellular network provider, or an email delivery system. During a process of registration wherein a user of system 1000 registers as a registered user of system 1000, a user sending registration data can send with permission data defining the registration data a permission that grants access by system 1000 to data of the user within social media system 500. On being registered, system 1000 in the support of an IVR session can examine data of social media system 500 e.g. to determine whether first and second users are in communication with one another via a messaging system of social media system 500. A user can enter registration data using a user interface displayed on a client computer device of a UE device 10A-10Z. Entered registration data can include e.g. name, address, social media account information, other contact information, biographical information, background information, preferences information, and/or permissions data e.g. can include permissions data allowing system 1000 to query data of a social media account of a user provided by social media system 500 including messaging system data and any other data of the user such as posts data of the user. When a user opts-in to register into system 1000 and grants system 1000 permission to access data of social media system 500, system 1000 can inform the user as to what data is collected and why, that any collected personal data may be encrypted, that the user can opt out at any time, and that if the user opts out, any personal data of the user is deleted.

Embodiments herein recognize performance deficiencies with existing interactive voice response (IVR) systems. For example, where a human user with use of a UE device is interacting with a virtual agent (VA), the VA often takes much longer to respond to a live voice message of the user than would a human agent. The human user can quickly become frustrated by the interaction with the VA and can voluntarily terminate an IVR session.

System 1000 can be configured to run an IVR application for interacting with a user associated to a UE device of UE devices 10A-10Z. According to one embodiment, the IVR application can run on a combination of computing nodes, such as one or more computing node of edge computing environment 100A and one or more computing node of core computing environment 200. The instances can be complementary to one another. The architecture described can feature advantages associated with centralization, e.g. the availability of asset data within core computing environment 200 accessible by all users, as well as advantages associated with edge computing, including reduced latency for latency sensitive applications.

Referring to FIGS. 1A-1C, according to one embodiment, IVR application instance 130 of edge computing environment 100A can be instantiated within VM 120, which can include together with IVR application instance 130 a guest operating system (OS) running on hypervisor 110. Hypervisor 110 in turn can be running on computing node 10 which can be provided by a physical computing node. Computing node 10 within edge computing environment 100A according to one embodiment can define an edge computing environment compute node and can be configured to be provisioned to provide network functions in accordance with NFV technologies and can also be provisioned to provide user services as set forth herein. Computing node 10 within edge computing environment 100A that hosts VM 120, according to one embodiment, can be provided by an edge server of a CDN. VM 120, in the particular embodiment of FIG. 1A, is described as being provided by a hypervisor based VM. In another embodiment, VM 120 can be provided by a container based virtual machine.

With further reference to FIGS. 1A and 1B, IVR application instance 230 running on core computing environment 200 can be instantiated within VM 220 which VM 220 can include IVR application instance 230, a guest operating system (OS). VM 220 can be running on hypervisor 210 which can be running on computing node 10, which computing node 10 can be provided by a physical computing node. VM 220 described in the particular embodiment of FIGS. 1A and 1B is being provided by a hypervisor based VM can alternatively be provided by a container based VM.

With reference to FIGS. 1B and 1C, IVR application instance 130 running within VM 120 can run various processes, including artificial intelligence (AI) response process 131, speech-to-text process 132, natural language processing (NLP) process 133, and asset data determination process 134.

IVR application instance 130 running AI response process 131 can perform AI functions for return of response decisions defining responses of a VA to receive voice data received from a user. According to one aspect, AI response process 131 can use decision trees to manage flow of a voice conversation between a VA and a human user. According to one embodiment, IVR application instance 130 running AI response process 131 can return responses in accordance with a customer service mission in which a user is a customer user seeking customer service respective to a purchased product such as a physical or service product. IVR application instance 130 running AI response process 131 can include IVR application instance 130 accessing historical data of a user participating in a conversation. Such historical data, in some instances, may have been used to train predictive model, modeling user behavior.

IVR application instance 130 running speech-to text process 132 can include IVR application instance 130 examining received voice data from a user as output by an audio input sensor of a user's UE device and converting such voice data to text. IVR application instance 130 in turn, once text corresponding to speech is acquired can input the returned text to various process interfaces, such as NLP process 133.

IVR application instance 130 can run natural language processing (NLP) process 133 for determining one or more NLP output parameter value of a message such as a message defined by text data extracted from voice data. NLP process 133 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter. By running of NLP process 133, IVR application instance 130 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message. Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." IVR application instance 130 running NLP process 133 can return general topics that generally describe more than one species topic, and/or can return species topics, e.g. keyword topics.

IVR application instance 130 running asset data determination process 134 can examine various data for return of action decisions to identify asset data to pull resources from core computing environment 200 into edge computing environment 100A for support of functions of IVR application instance 130. In one aspect, IVR application instance 130 running asset data determination process 134 can examine data of data queries by IVR application instance 130 to resources of core computing environment 200 in dependence on a count and/or rate of such data queries can return an action decision to pull resource data of the queried resource. IVR application instance 130 running asset data determination process 134 can examine returned topics returned by running of NLP process 133 and based on examination of NLP topic data can return action decisions to pull resources in dependence on extracted topic data. For example, on initiation of a new IVR session IVR application instance 130 can determine that a current conversation relates to the ACME Model 001 Smartphone and can responsively pull records from a database stored in storage system 250 for storage into storage system 150 which can be local to VM 120 for support of functions of IVR application instance 130. IVR application instance 130 running asset data determination process 134 can examine various data for return of action decisions to re-order asset data within one or more storage system. IVR application instance 130 running asset data determination process 134 can examine various data for return of action decisions to specify a manner in which VM 120 searches for data within one or more storage system.

IVR application instance 130 running asset data determination process 134 can determine state of a current IVR application instance e.g. using a decision tree in which state can map to a location on a decision tree. IVR application instance 130 running asset data determination process 134 can include IVR application instance 130 querying a predictive model that has been trained with training data that comprises historical session data of system 1000.

IVR application instance 230 can run various processes including session initiate process 231, speech-to-text process 232, natural language processing (NLP) process 233, asset data determination process 234, query data receive process 235, and asset data request receive process 236. For supporting functions of IVR application instance 230, IVR application instance 230 can be in communication with storage system 250 local to VM 220 disposed within core computing environment 200, shown in logical view form as data repository 240.

IVR application instance 230 running session request process 231 can receive and process session initiate data from a user. IVR application instance 230 running session request process 231 can include IVR application instance 230 discovering of VM 120 within edge computing environment 100A and conditionally instantiating VM 120 within edge computing environment 100A.

IVR application instance 230 running speech-to text process 232 can include IVR application instance 230 examining received voice data from a user as output by an audio input sensor of a user's UE device and converting such voice data to text. IVR application instance 230 in turn, once text corresponding to speech is acquired can input the returned text to various process interfaces, such as NLP process 233.

IVR application instance 230 can run NLP process 233 for determining one or more NLP output parameter value of a message such as a message defined by text data extracted from voice data. NLP process 233 can operate in the manner described for NLP process 133.

IVR application instance 230 running asset data determination process 234 can include IVR application instance 230 determining asset data for subjecting to prioritization. Prioritization of selected asset data by IVR instance 230 can include returning of action decisions to push selected asset data for storage caching on storage system local to VM 120, to tier selected asset data to a higher storage tier, and/or assigning the selected asset data to a prioritized search.

IVR application instance 230 running query data receive process 235 can process asset data queries by VM 120 on data repository 240 of core computing environment 200 for access of asset data and can return asset data to VM 120 in response to such queries.

IVR application instance 230 running asset data request receive process 236 can receive and process asset data pull requests from IVR application instance 130. IVR application instance 230 running asset data request receive process 236 can, in response to an asset data pull requests from VM 120 send asset data to edge computing environment 100A for storage caching into storage system 150.

Data repository 240 can store various data. Data repository 240, in libraries area 241 can store software libraries that support the functions of one or more computer program defining IVR application instance 130 and one or more computer program defining IVR application instance 230. In users area 242, data repository 240 can store data on users of system 1000 on registration into system 1000. System 1000 can assign each new registered user a universally unique identifier (UUID). Associated with each UUID, users area 242 can store e.g. name information, contact information, phone information, social media address information, and profile information, i.e. data defining preferences of a user. Users area 242 can also include predictive models that model behavior of users.

Figure 4B:
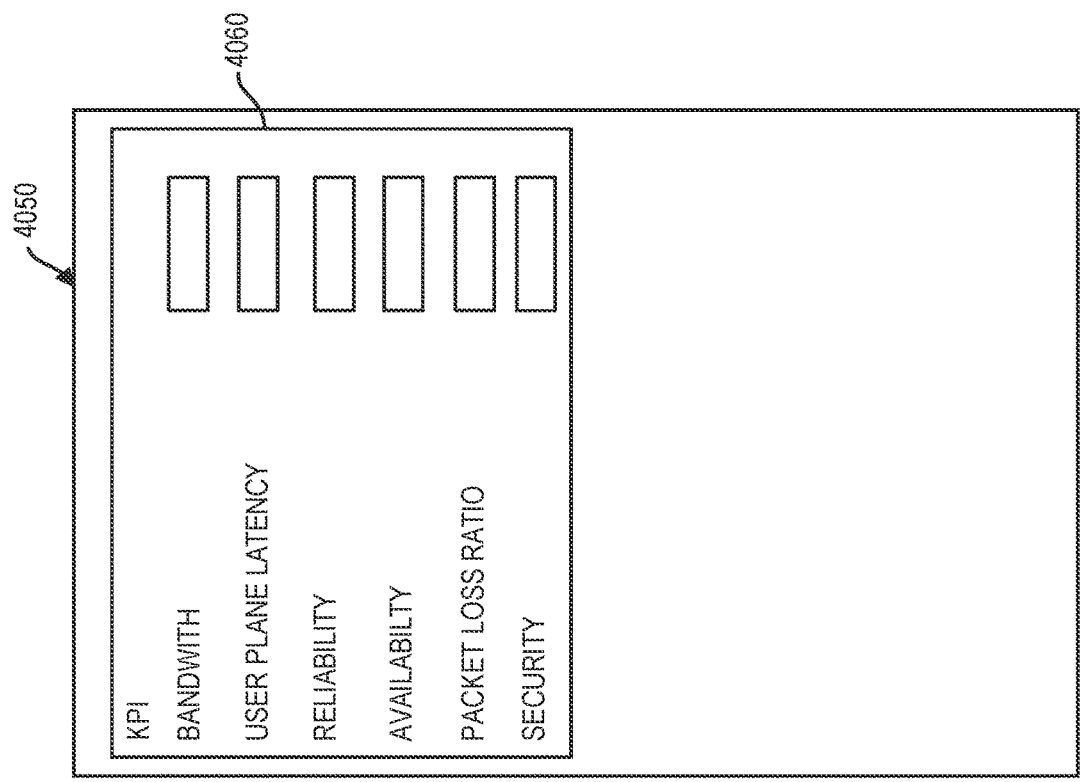
FIG. 4B depicts a user interface for use by an operator user according to one embodiment.
Figure 4A:
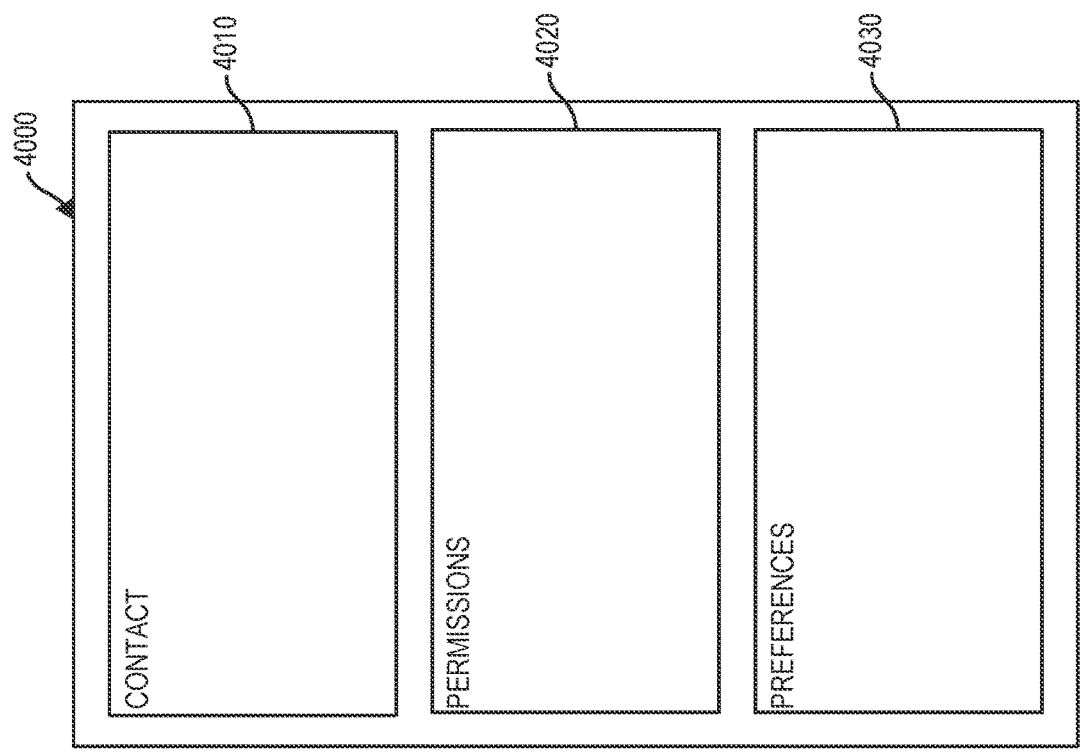
FIG. 4A depicts a displayed user interface for use by a user equipment device user according to one embodiment.

FIG. 4A depicts a displayed user interface 4000 which can be used by a user to enter registration data, such as contact data, permissions data, and permissions. User interface 4000 can be displayed on a display of a user's UE device. In area 4010 a user can enter contact data, in area 4020 a user can enter permissions data, and in area 4030 a user can enter preferences data. Preferences data can be entered by completion of a preferences survey. Preferences of a user in addition or alternatively can be obtained e.g. by IVR application instance 230 or IVR application instance 130 iteratively querying a social media system 500, or by examination of sensor output data output of a UE device of a user. Preferences of a user can be determined from social media data by activation of natural language processing to extract topics from social media system 500. A topic associated to a positive sentiment can be recorded as positive preference. A topic associated to a negative sentiment can be recorded as negative preference. Data repository 240 in users area 242 can store data on trained predictive models that have been trained with use of historical data of system 1000. Predictive models can include predictive models that predict, e.g. behavior of the user or which predict future topic and/or state of a current IVR session. Data repository 240 in products area 243 can store data on products for which customer support is provided using system 1000. Products can include e.g. physical products and/or service products. Data repository 240 in decision data structures area 244 can store decision data structures that are used by IVR application instance 230 for return of action decisions. Data repository 240 in topics area 245 can store data on topics associated to assets of data repository 240. Topics area 245 can include data associated asset identifiers to topic tags for such asset identifiers. Data repository 240 in sessions area 246 can store data on historical sessions of system 1000. Session data can include, e.g. data on topics identified by NLP processing during an IVR session, a history of state transitions of an IVR session, and/or raw conversation data of historical IVR sessions.

System 1000 can be configured so that in the running of an IVR session, a subset of asset data of data repository 240 can be received into data repository 140 of edge computing environment 100A. Users area 242 of data repository 240 can include a superset of data stored in users area 142 of data repository 140. Data repository 140 refers to a logical representation of asset data that can be stored within storage system 150 that can be local to VM 120. Data repository 140, in libraries area 141 can store software libraries that support the functions of one or more computer program defining IVR application instance 130. Data repository 140, in users area 142 can store data of a user of IVR application instance 130 during a current IVR session and other users references during a current IVR session. Data repository 140, in decision data structures area 144 can store decision data structures for return of action decision by IVR application instance 130. Libraries area 141, users area 142, and products area 143 of data repository 140 can include a subset of data stored within data repository 240. According to one embodiment, libraries area 141 can store a subset of data stored within libraries area 241 of data repository 240, users area 142 of data repository 140 can store subset of data stored in users area 242 of data repository 240, products area 143 of data repository 140 can store a subset of data stored in products area 243 of data repository 240. In accordance with features set forth herein IVR application instance 130 can be configured to iteratively pull asset data stored within data repository 240 into data repository 140. Additionally, or alternatively, IVR application instance 230 can be configured to push asset data of data repository 240 into data repository 140.

Embodiments herein recognize that latency of an IVR session can be reduced by instantiating IVR application instance 130 in proximity with a user, i.e., so that IVR application instance 130 runs on a computing node within edge computing environment 100A in proximity with a user. In some embodiments, IVR application instance 130 can be instantiated within "the last mile" of a user for reduced latency. Embodiments herein further recognize that latency of an IVR session can be further reduced by dynamically receiving asset data during an IVR session in proximity with IVR application instance 130 so that data queries by IVR application instance 130 on data repository 240 are reduced.

VM 220 and VM 120 can be in communication with network slice management function (NSMF) 260, which NSMF 260 can have an associated slice registry 270. NSMF 260 can be run on a computing node 10 of core computing environment 200 or edge computing environment 100A. Slice registry 270 can store data on network slices of system 1000. Network slicing refers to a network architecture for enabling multiplexing of virtualized and independent logical networks on a common physical network infrastructure. Each network slice can be provided as an end-to-end network tailored to fulfill diverse requirements requested by a certain application. A network slice can refer to elements of the network configured for the provisioning of a certain type of service. There can be different requirements on functionality (e.g., priority, policy control), differences in performance requirements (e.g., bandwidth, user plane latency, reliability, availability, packet loss ratio, security and other slice parameters), or they can serve only specific types of users. The different slices can be used simultaneously. Bandwidth can be expressed in terms of e.g. Hz and/or bits/s.

Network slicing can use software defined networking (SDN) and network function virtualization (NFV) so that a network slice is configured to deliver specified key performance indicators (KPIs) defined by slice parameter values for the network slice persistently (continually) over time. Management and Orchestration (MANO) featurization of system 1000 can be in accordance the following specifications published by the European Telecommunications Standards Institute (ETSI): ETSI GSNFV-SOL001, ETSI GSNFV-SOL002, ETSI GSNFV-SOL003, ETSI GSNFV-SOL004, ETSI GSNFV-SOL005, ETSI GSNFV-SOL006, ETSI GSNFV-SOL007, and ETSI GSNFV-SOL013. Management and Orchestration (MANO) featurization of system 1000 can also be in accordance with the documents of 3GPP TS 28.530 V15.1.0 Release 15 by the 3rd Generation Partnership Project (3GPP) and the technical reports of Release 16 of the 3GPP (3GPP Release 16 reports). According to one embodiment, Single-Network Slice Selection Assistance Information (S-NSSAI) can be used to provide a network slice identifier for identification of a network slice. NSSAI refers to a collection of S-NSSAI (Single-Network Slice Selection Assistance Information) values which can be sent to the network by a UE device to assist a network in selecting a particular Network Slice. Usage of network slice identifiers for network slice participation management can be performed according to the documents of Release 15 of the 3rd Generation Partnership Project (3GPP) (3GPP Release 15 documents) and the technical reports of Release 16 of the 3GPP (3GPP Release 16 reports). The NSSAI (Network Slice Selection Assistance Information) is a collection of S-NSSAIs. Multiple S-NSSAIs defining NSSAI can be sent in signalling messages between a UE device and a network. A single UE device can be served by multiple network slices at a time. The S-NSSAI signalled by a UE device to the network, assists the network in selecting a particular network. A network slice instance can refer to set of network function instances and the required resources (e.g. compute, storage and networking resources) which form a deployed network slice. A network slice herein can be provided by a paired network slice characterized by a first slice of a first domain being paired to a second slice of a second domain, and in some cases one or more additional domain specific slice.

Slice registry 270 can store data on a current status of a plurality of slices. Status data of a slice can include, e.g. in preparation, active and reserved, active and available, or inactive. Slice specification parameters can be associated with each slice specified in slice registry 270. Slice specification parameters can include, e.g. bandwidth, user plane latency, reliability, availability, packet loss ratio, security and other slice parameters. Minimum and maximum values can be specified for each slice. An operator of an entity providing a service can use a user interface to define requirements for new slices or to define parameter value sets for new slices or system 1000 can generate specification data for new slices autonomously. System 1000 can be configured to permit an operator user to update slice registry 270 to include new network slices with use of displayed user interface 4050 as shown in FIG. 4B having area 4060 to permit an operator user to specify parameter values. Maximum and/or minimum values can be specified by an operator user using user interface 4050. On receipt of an order for a new slice by an operator user NSMF 260 can send a request to control plane orchestrator 400 to instantiate the new slice.

In addition to storing data on network slices of system 1000, NSMF 260 can respond to requests for instantiation of new slices. A request for instantiation of a new slice can include parameter value specification data for a slice. In response to receipt of a request for a new slice, NSMF 260 can forward the request to control plane orchestrator 400. Control plane orchestrator 400 for instantiation of a slice can assign a slice identifier to the slice and can return the slice identifier to NSMF 260, which in turn can distribute the slice identifier to participating nodes participating in a network slice. Control plane orchestrator 400 can be provided by one or more entity. Control plane orchestrator 400 can be responsible for communicating with computing nodes of core computing environment 200 and edge computing environment 100A so that an instantiated slice is configured for persistent (continual) delivery of specified key performance indicators (KPIs) defined by specified slice parameter values that are specified in a slice instantiation request. Table A below depicts data of slice registry 270, according to one embodiment. Slice identifiers according to one embodiment can be assigned in accordance with NSSAI functionality described in 3GPP TS 38.300 version 15.3.1 Release 15 by the 3rd Generation Partnership Project (3GPP) and 3GPP TS 28.530 V15.1.0 Release 15 (3GPP).

TABLE A

| Slice | Status | Parameter Values | ... |
|---|---|---|---|
| ... | ... | ... | ... |
| S101 | Active, Reserved | XX; XX; XX; XX; XX | ... |
| S102 | Active, Available | XX; XX; XX; XX; XX | ... |
| S103 | Inactive | XX; XX; XX; XX; XX | ... |
| S104 | Prepared | XX; XX; XX; XX; XX | ... |
| S105 | Active, Available | XX; XX; XX; XX; XX | ... |
| ... | ... | ... | ... |

System 1000 can be configured to select one or more network slice for support of an IVR session. Referring to FIG. 3C system 1000 can be configured to select slice $S_A$ for supporting communications between VM 220 and VM 120, e.g. asset data pushes from VM 220 to VM 120 and asset data pulls by VM 120 from VM 220. System 1000 can also be configured to select a network slice $S_B$ for support of communications between VM 320 and VM 120, e.g. asset data pushes from VM 320 to VM 120 and asset data pulls from VM 320 by VM 120. System 1000 can also be configured to select a network slice for communications, e.g. including voice data communications between VM 120 and UE device 10A during an IVR session. During performance of an IVR session, system 1000 can be configured to be operative so that a configuration of a slice, as defined by one or more slice parameter value, dynamically varies e.g. increases or decreases, during performance of an IVR session. System 1000 can also be configured so that during an IVR session one or more of VM 220, VM 320, VM 120, or UE device 10A communicates with the new network slice during performance of an IVR session.

Figure 3A:
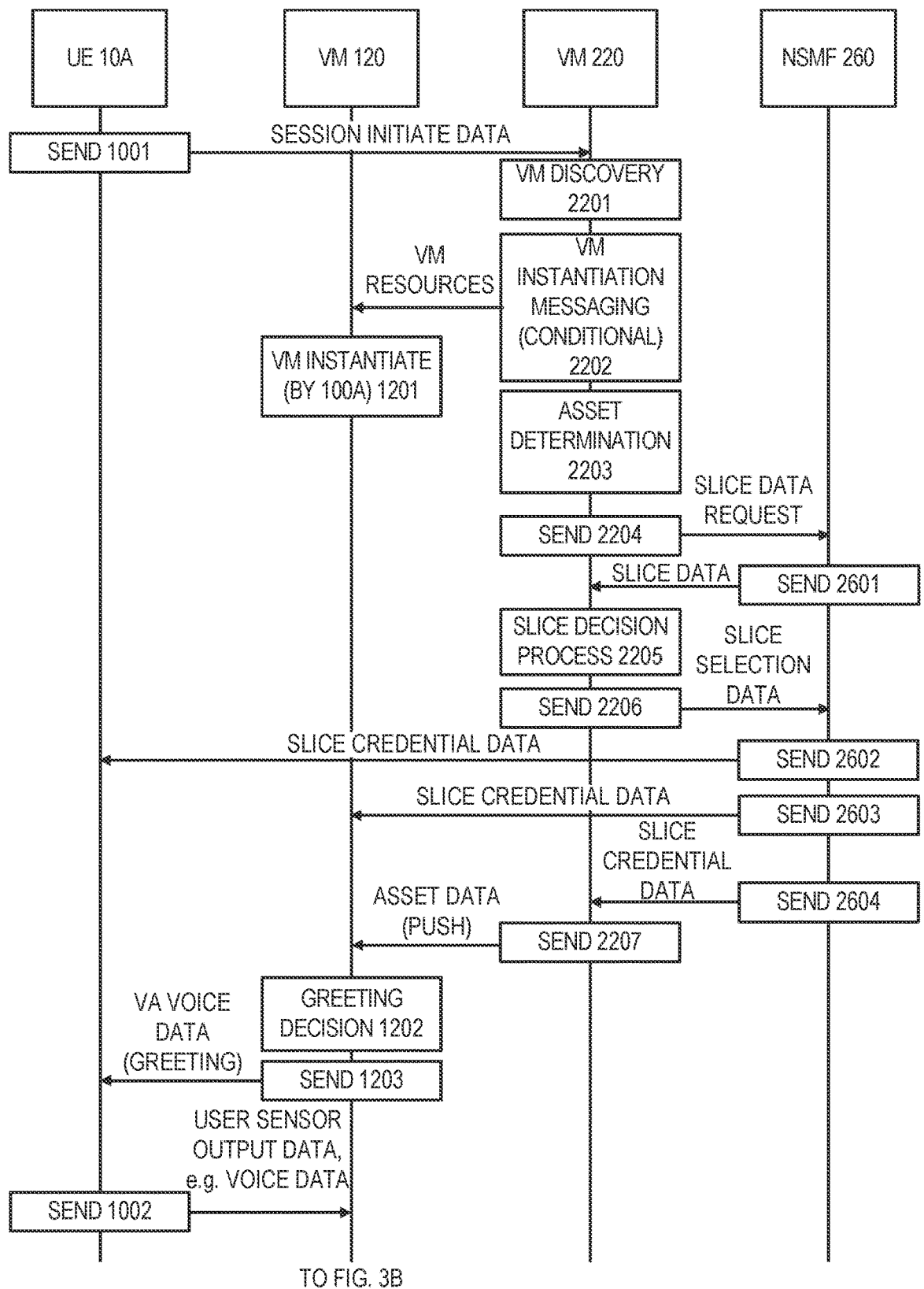
FIGS. 3A-3B is a flowchart illustrating a method for performance by a core computing environment virtual machine interoperating with an edge computing environment virtual machine, a user equipment device, and a network slice management function according to one embodiment.
Figure 3B:
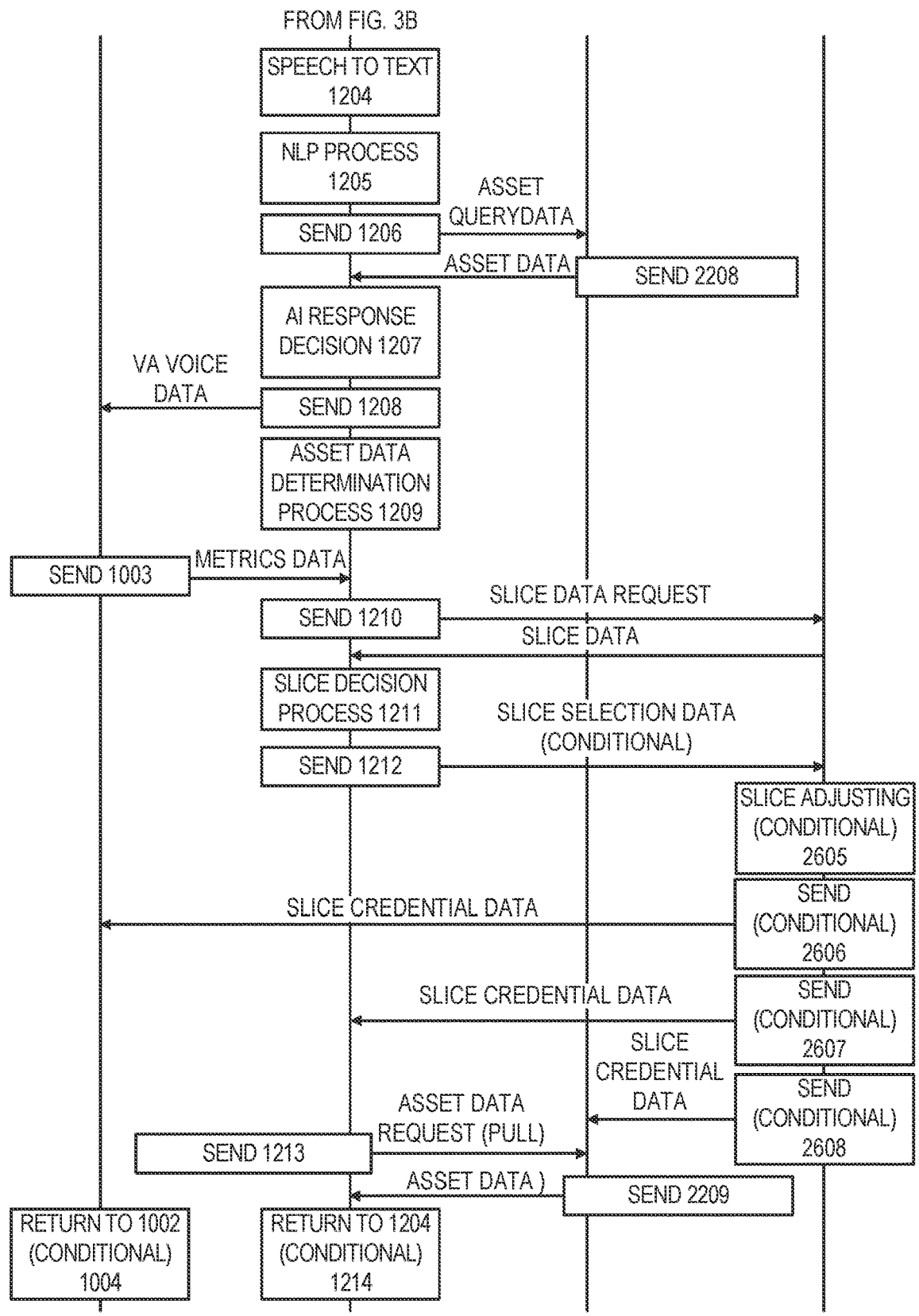

FIGS. 3A-3B is a flowchart depicting operation of VM 220, VM 120, UE device 10A, and NSMF 260 for performance of an IVR session, according to one embodiment. At block 1001 UE device 10A can be sending session initiate data for receipt by VM 220, which session can be initiated with the sending at block 1001. Session initiate data can include a user identifier, e.g., as determined by lookup from an address of UE device 10A, user data stored on UE device 10A, touchtone menu entries, and the like. Session initiate data can also be accompanied by product identifying data specifying the product, e.g. a physical product and/or a service product. The product data can be entered, e.g., via touchtone menu selection, audio clips, and the like. VM 220, on receipt of the session initiate data, can proceed to block 2201. Session initiate data sent at block 1001 can include sensor output data, e.g. which can include voice data from an audio input sensor and other sensor output data as can be output e.g. by a location GPS sensor, a health biometrics (e.g. pulmonary) sensor, an environmental condition sensor (e.g. humidity, air temperature).

At block 2201, VM 220 can perform VM discovery to determine whether there is an available VM in edge computing environment 100A capable of hosting the current IVR session. If a VM is required to be instantiated in edge computing environment 100A, VM 220 at block 2202 can perform VM instantiation messaging. VM instantiation messaging can include e.g. messaging appropriate authorities 215 and 115 of core computing environment 200 and/or edge computing environment 100A for instantiating of a new VM within edge computing environment 100A. Instantiation messaging can specify that the new VM is to be instantiated at a location in edge computing environment 100A in close physical proximity to UE device 10A, e.g. on a compute node defining a RAN or an available server of a CDN. VM instantiation messaging at block 2202 can include VM 220 sending to edge computing environment 100Z VM resources for instantiation of VM 120. On receipt of VM resources at block 1201, VM 120 can be instantiated a computing node 10 of edge computing environment 100A.

Further referring to functions of VM 220, VM 220 at block 2203 can perform asset determination to determine an initial asset data push for support of the new IVR session being requested. Embodiments herein recognize that it can be advantageous to provide, at a centralized location, a store of assets for support of a variety of IVR sessions by users who are potentially distributed worldwide. Assets can include, e.g. file data including file data of files defining software libraries and databases, including databases that store data of users who may participate in an IVR session and/or products, e.g. physical products and/or service products that are referenced during an IVR session. VM 220, at block 2203 can perform asset determination for determining asset data from data repository 240 to be received in data repository 140 local to IVR application instance 130. For performing block 2203, VM 220 can use the formula of Eq. 1 as follows.

$$TS = F_1 W_1 + F_2 W_2 + F_3 W_3 + F_4 W_4 \quad \text{(Eq. 1)}$$

Where TS is a strength score applied by VM 220 to a candidate topic, $F_1$ is a first factor, $F_2$ is a second factor $F_3$ is third factor, $F_4$ is fourth factor, and $W_1$-$W_4$ are weights associated the various factors $F_1$-$F_4$. VM 220 can be configured to apply Eq. 1 to each of a plurality of candidate topics. VM 220 can identify the strongest topics associated to a current IVR session, such as the IVR session being initiated at block 1001, the basis of which candidate topics produce the highest strength scores to Eq. 1. Upon determining topic strengths of topics associated to the current IVR session, VM 220 at block 2203 can examine topics area 245 of data repository 240 to identify assets therein having topics that match the scored topics of the current IVR session. Candidate topics can include an aggregation of topics identified according to factors $F_1$-$F_4$. The strength score TS can indicate a prediction as to a likelihood of the topic being present in a current IVR session subsequently to a current time.

Factor $F_1$ can be a current session factor. VM 220 by IVR application instance 230 at block 2203 can increment a scoring value assigned to a candidate topic under factor $F_1$ from a baseline value where the topic is observed in the current session and can decrement a value assigned under factor $F_1$ where the candidate topic is not observed in the current session. At the time of performance of block 2203, VM 220 can have identified a limited number of topics regarding the session based on the session initiate data sent at block 1001. Such data, as set forth herein, can include, e.g. a user topic, and a product topic, and other topics. A product topic can refer to the primary product (physical or service) to which the current IVR session relates, which can be extracted from an initial e.g. touchtone or VA voice menu.

According to factor $F_1$ candidate topics observed in a candidate session can be assigned relatively high values under factor $F_1$, whereas topics not identified in a current session as of the time of performance of block 2203 can be assigned lower value, i.e. null values, e.g. TS=0.0. Topics identified at the time of performance of block 2203 can include topics identified using sensor output data sent by UE device 10A at block 1001. Sensor output data can include voice data from an audio input sensor and other sensor output data as can be output e.g. by a location GPS sensor, a health biometrics (e.g. pulmonary) sensor, an environmental condition sensor (e.g. humidity, air temperature). For processing of voice data, the voice data can be subject to speech to text processing for return of text data, and the text data can be subject to processing by NLP process 233 for return of extracted topics. Sensor output data including output data output by a sensor disposed in UE device 10A. Such output data can include GPS data specifying a current location of UE device 10A. Under factor $F_1$, VM 220 can also examine an output of a health biometric sensor disposed in UE device 10A, e.g. a pulmonary sensor, a body temperature sensor. Similarly, VM 220 under factor $F_1$ can extract a topic by examining data of an output of an environmental condition sensor, such as a humidity sensor, barometric pressure sensor, or a temperature sensor.

For determining a topic associated to sensor output data, VM 220 can examine a location-to-topic cognitive mapping decision data structure as set forth in Table B below.

TABLE B

| Row | Sensor output data | Extracted topic |
| --- | --- | --- |
| 1 | Location coordinates map to a sporting events venue | Live sports |
| 2 | Location coordinates map to auto parts store | Car repair |
| 3 | Location coordinates map to hiking trail | Hiking |
| 4 | Air humidity sensor output exceeds normal range | Rain |
| 5 | Pulmonary sensor output indicative of exercise | Exercise |
| 6 | Body temperature sensor output exceeding normal range | Sickness |
| ... | ... | ... |

Using Table B, VM 220 can examine various sensor output data received by VM 220 from the sending at block 1101 to extract additional topics observed from a current IVR session. VM 220 by IVR application instance 230 at block 2203 can increment a scoring value assigned to a candidate topic under factor $F_1$ from a baseline value where the topic is observed in the current session and can decrement a value assigned under factor $F_1$ where the candidate topic is not observed in the current session.

Regarding factor $F_2$ of Eq. 1, factor $F_2$ can be an historical data factor. Factor $F_2$ can be a current user historical IVR session data factor. According to factor $F_2$, VM 220 can examine historical IVR session data of a user. The prior sessions of the user can include sessions of the product of the current session identified and sessions involving additional topics. For each candidate topic scored using Eq. 1, VM 220 can increment scoring values from a baseline under factor $F_2$ where the candidate topic was identified in prior IVR sessions of the user and can decrement values under factor $F_2$ from a baseline where the candidate topic was not identified in a prior IVR session of the current user.

Factor $F_3$ can be an all users historical session data factor for the current product. According to factor $F_3$, VM 220 can examine historical session data for all users of system 1000 for IVR sessions in which a product of the session is in common with the current product of the current IVR session. VM 220 can increment values under factor $F_3$ for a candidate topic where a common candidate topic was strongly present (e.g. as can be determined from a count of identifications) in the prior IVR sessions for all users and can decrement a value under factor $F_3$ where the candidate topic was weakly present and/or not present in the historical IVR sessions of all users. The use of factor $F_3$ defines use of crowdsource data for return of an AI action decision.

Regarding factor $F_4$ of Eq. 1, factor $F_4$ can be a non-session behavior history factor of the current user. For a candidate topic, VM 220 can increment values under factor $F_4$, where the candidate topic is strongly present in historical behavior data of the user and can decrement a value under factor $F_4$ where the candidate topic is weakly present and/or not present in historical behavior data of the current user. Behavior data can include non-IVR session behavior data under factor $F_4$ can include, e.g. shopping history data of the user, e.g. live shopping history data or online shopping history data of the user, as can be determined from examination of data from UE device 10A (e.g. location data based on stores visited or online shopping history as can be determined by examination of a user's browsing history available from UE device 10A). Non-IVR session behavior history data under factor $F_4$ can include data derived by examination of social media account data of a user. For example, VM 220 can be configured to iteratively, during the deployment period of system 1000, examine data of social media system 500 to subject, e.g. posts data and message data of a user to extract topics of positive interest or negative interest to the user. Topic extraction can be performed by activation of NLP process 233 running on VM 220 to process social media data posts data and/or message data.

VM 220 at block 2203 can provide an ordered list that lists the highest scoring topics of a current IVE session being initiated as set forth in Table C.

TABLE C

| Order | Candidate Topic | Strength score, TS |
|---|---|---|
| 1 | "XX" | 0.97 |
| 2 | "XX" | 0.96 |
| ... | "XX" | ... |
| 999 | "XX" | 0.02 |

Strength score, TS, can provide a prediction that the topic will be present in the current IVR session at a time during the session subsequent to the current time. A larger strength score, TS, can indicate a greater likelihood that the topic will be present in the current IVR session subsequent to a current time. VM 220 at block 2203 can return an action decision to prioritize certain asset data of one or more storage system of system 1000. The asset data can include asset data for use by system 1000 in generating VA responses in dependence on the topic scoring, and therefore in dependence on the obtained data used to generate topic scores. VM 220 can perform selection of certain asset data for prioritizing using the scoring and/or ranking of topics as depicted in Table C. VM 220 for example can select certain asset data for prioritization based on topics of the certain asset data having threshold exceeding strength scores. VM 220 for example can select certain asset data for prioritization based on the certain asset data having associated topics ranked in a top threshold percentage of topics ranked by strength as set forth in Table C. System 1000 prioritizing certain asset data of one or more storage system, e.g. storage system 150 and/or storage system 250 can include e.g. (a) receiving the certain asset data for storage caching into a local storage system local to VM 120, (b) adjusting a tiering of storage volumes for storing the certain asset data, and/or (c) adjusting a searching prioritization for searching the certain asset data. For performing (a), VM 220 can communicate with VM 120 to push selected asset data e.g. asset data associated topics having strength scores exceeding a threshold for storage into storage system 150 mapping to data repository 140. For performing (b), VM 220 can send a command communication to storage controller 154 and/or storage controller 254 to adjust tiering of storage so that storage of selected asset data is in accordance with a current order of topic strength scoring e.g. so that assets associated to higher scored topics are assigned to higher tiered storage. For performing (c), VM 220 can send a command communication to storage controller 154 and/or storage controller 254 to adjust a search prioritization e.g. so that assets associated to topics are subject to searching in an order dependent on the current order of ranking of candidate topics with assets associated to a topic having a first score being searched prior to assets associated to a second score where the first score is greater than the second score. In response to the action decision returned at block 2203 VM 120 can proceed to block 2207. VM 220, at block 2203 according to one embodiment for prioritizing according to (a) can identify all candidate topics in the list having scores that exceed a threshold score and can select such asset data for pushing to storage system 150 represented in logical view form by data repository 140. VM 220 can also or alternatively perform prioritizing of certain asset data according to (a) and/or (b) at block 2207.

For performance of block 2203, VM 220 can examine topic data of topics area 245 of data repository 240. For populating data of topics area 245 VM 220 can be configured to iteratively examine assets stored in data repository 240 for support of all IVR sessions supported by system 1000 as classified by product. VM 220 and can examine all file data defining such asset data by activation of NLP process 233 in order to extract a topic associated with each asset. For extraction of topics from file data, VM 220 can subject content of files to NLP processing as well as file names for files and file directory names. Data of topics area 245 can include data as shown in Table D.

TABLE D

| Asset | Topic | Size | Timestamp | Type | ... |
|---|---|---|---|---|---|
| F001 | T097 | XX | XX | Non-Playback | ... |
| F002 | T045 | XX | XX | Playback | ... |
| F003 | T097 | XX | XX | Non-Playback | ... |
| F004 | T011 | XX | XX | Interactive Playback | ... |
| ... | ... | ... | ... | ... | ... |

Referring to Table D, assets of data repository 240 can be tagged with topic tags that specify a topic of the asset. Assets specified in Table D can be associated to topic tags, a timestamp specifying time of creation of the asset, asset type, and other tags. With use of the decision data structure of Table D, VM 220 according to one embodiment can return the action decision to push asset data associated to topics having threshold exceeding strength scores to data repository 240. With use of the decision data structure of Table D, VM 220 according to one embodiment can return the action decision to adjust tier assignment of assets of data repository 140 and/or data repository 240 according to strength scores (Table B) of topics associated to the respective assets with assets associated to higher scoring topics assigned to higher tiers for storage and assets associated to lower scoring topics assigned to lower tiers of storage. With use of the decision data structure of Table D, VM 220 according to one embodiment can return the action decision to adjust asset data search prioritization of assets of data repository 140 and/or data repository 240 according to strength scores (Table C) of topics associated to the respective assets with assets associated to higher scoring topics assigned to higher search prioritizations and assets associated to lower scoring topics assigned to lower search prioritizations so that assets assigned to higher search prioritizations are searched before assets assigned to lower search prioritizations.

At block 2204, VM 220 can send a slice data request to NSMF 260, which can return slice data at block 2601 and at block 2205, VM 220 can perform a slice decision process to determine selection data for selecting network slices for support of the current IVR session. Returned slice data can include data such as that described in Table A.

Referring to Table A, returned slice data can include e.g. slice identifiers associated respectively to status data, and parameter values associated to the slice. Slice parameter values can include e.g., bandwidth parameter values (e.g. in bits/s), user plane latency parameter values, reliability parameter values, availability parameter values, packet loss ratio parameter values, security parameter values and other slice parameters. According to a security parameter value, a first security parameter value, e.g. security=0 can indicate that the slice can be participated in by multiple tenants (mapping to multiple enterprises) and a second security value, e.g. security=1 can indicate that participation in the slice is restricted to a single tenant.

Figure 2:
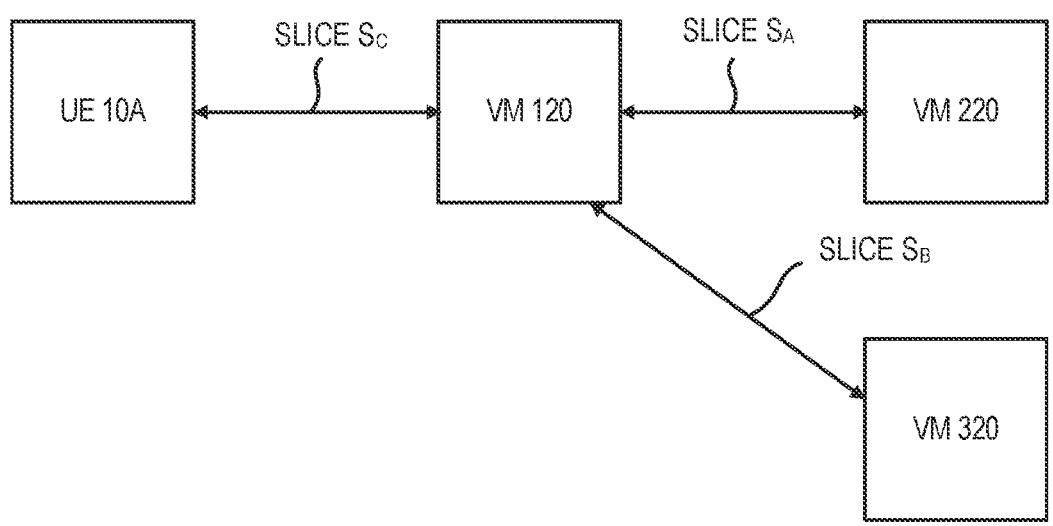
FIG. 2 depicts an arrangement of nodes and network slices for support of an IVR session according to one embodiment.

Referring to FIG. 2, VM 220 at block 2205 can select one or more slice for support of the current IVR session. A slice can be selected for e.g. the data path between VM 220 and VM 120, shown as generical slice $S_A$, the data path between VM 320 and VM 120, shown as generical slice $S_B$, and/or for the data path between VM 120 and UE device 10A, shown as generical slice $S_C$. VM 220 for determination of the requirements of the noted slices can examine data of topics area 245 as discussed in connection with Table D. According to one embodiment, VM 220 using the Table D data and a returned asset data transfer decision returned at block 2203 (the data to be received by data repository 140) can ascertain the aggregate size of data for transfer and can base a bandwidth parameter value selection for a network slice for data communications between VM 220 and VM 120 accordingly (generical slice $S_A$ shown in FIG. 2). VM 220 at block 2205 using the Table D data and identified asset data for transfer can examine the file type data of Table D for determining one or more parameter value characterizing a slice for facilitation of data communications between VM 120 and UE device 10A. Referring to the type column of Table D, for example, VM 220 can ascertain that a certain file data is multimedia file data that may be streamed by VM 120 to UE device 10A and may require significant bandwidth exceeding a threshold for interacting with the user. VM 220 accordingly, can select a minimum bandwidth parameter value for a slice to accommodate data traffic between VM 120 and UE device 10A.

Based on the examination of size and type data of Table D in connection with the assets data determined to be designated for transfer to data repository 140, VM 220 at block 2205 can return slice selection data. Slice selection data determined at block 2205 can include slice identifiers if available slices matching the determined performance characteristics of the slices are identified within the slice data sent at block 2601 (which can include the slice table data of Table A). If VM 220 does not identify an active and available slice matching the determined performance data at block 2205, slice selection data sent at block 2206 can include slice specification data that specifies slice parameter values defining a slice. On completion of block 2205, VM 220 can proceed to block 2206 to send slice selection data to NSMF 260.

In the case that a slice specified by the slice selection data has not been instantiated, NSMF 260 can, on receipt of the slice selection data, send an instantiation request to control plane orchestrator 400 for instantiation of the slice. NSMF 260, can then proceed to blocks 2602, 2603, and 2604 to send slice credential data to UE device 10A, VM 120, and VM 220 respectively. Slice credential data can include, e.g. slice identifier and/or addressing data received. The received slice credential data can provide the receiving node sufficient information for configuring the receiving node to send and receive IVR session traffic over the defined network slice.

In response to VM 220, VM 120, and UE device 10A being configured to communicate over selected network slices, VM 220 can proceed to block 2207 to push asset data identified at block 2203 based on topic data for receipt by VM 120. The pushed asset data can be pushed over the network slice selected for accommodation of traffic from VM 220 to VM 120. At block 2207 VM 220 can also or alternatively perform (b) adjusting a tiering of storage volumes for storing asset data, and/or (c) adjusting a searching prioritization of selected asset data according to the action decision returned at block 2203.

On receipt of the pushed asset data sent at block 2207, VM 120 can cache the received asset data into storage system 150, local to VM 120. The received asset data sent at block 2207 can be cached into storage system 150 as a storage cache. On the storing caching of the received asset data, pushed at block 2207, VM 120 can proceed to block 1202.

Blocks 2203-2207 are described as being performed by VM 220. In another embodiment, blocks 2203-2207 can be performed by VM 120 instead of VM 220. For example, in one embodiment, VM 220 in response to receipt of session initiate data sent at block 1001 can redirect to VM 120 (if instantiated) and VM 120 instead of VM 220 can perform blocks 2203-2207 with the asset data push by VM 220 at block 2207 being substituted for by an asset data pull by VM 120.

At block 1202, VM 120 can determine a voice greeting and at block 1203 VM 120 can send virtual assistant (VA) voice data to UE device 10A as a synthesized voice greeting. In response to the receipt of the voice greeting, a user with use of UE device 10A at block 1002 can send responsive voice data message for receipt by VM 120. Accompanying the voice data provided by audio input sensor output data, there can be sent at block 1002 additional sensor output data, such as sensor output data, e.g. of a location specifying GPS device disposed within UE device 10A, health biometric sensor output data, and environment condition sensor output data.

At block 1204, VM 120 can subject received voice data sent at block 1002 to speech-to-text processing to extract text data from speech data of the user. With voice data converted to text data, VM 120 at block 1205 can subject the text data to NLP processing by activation of NLP process 133 running on VM 120. VM 120 can return topics associated to the voice data using the NLP processing. On completion of block 1205 VM 120 can proceed to block 1206.

Figure 5:
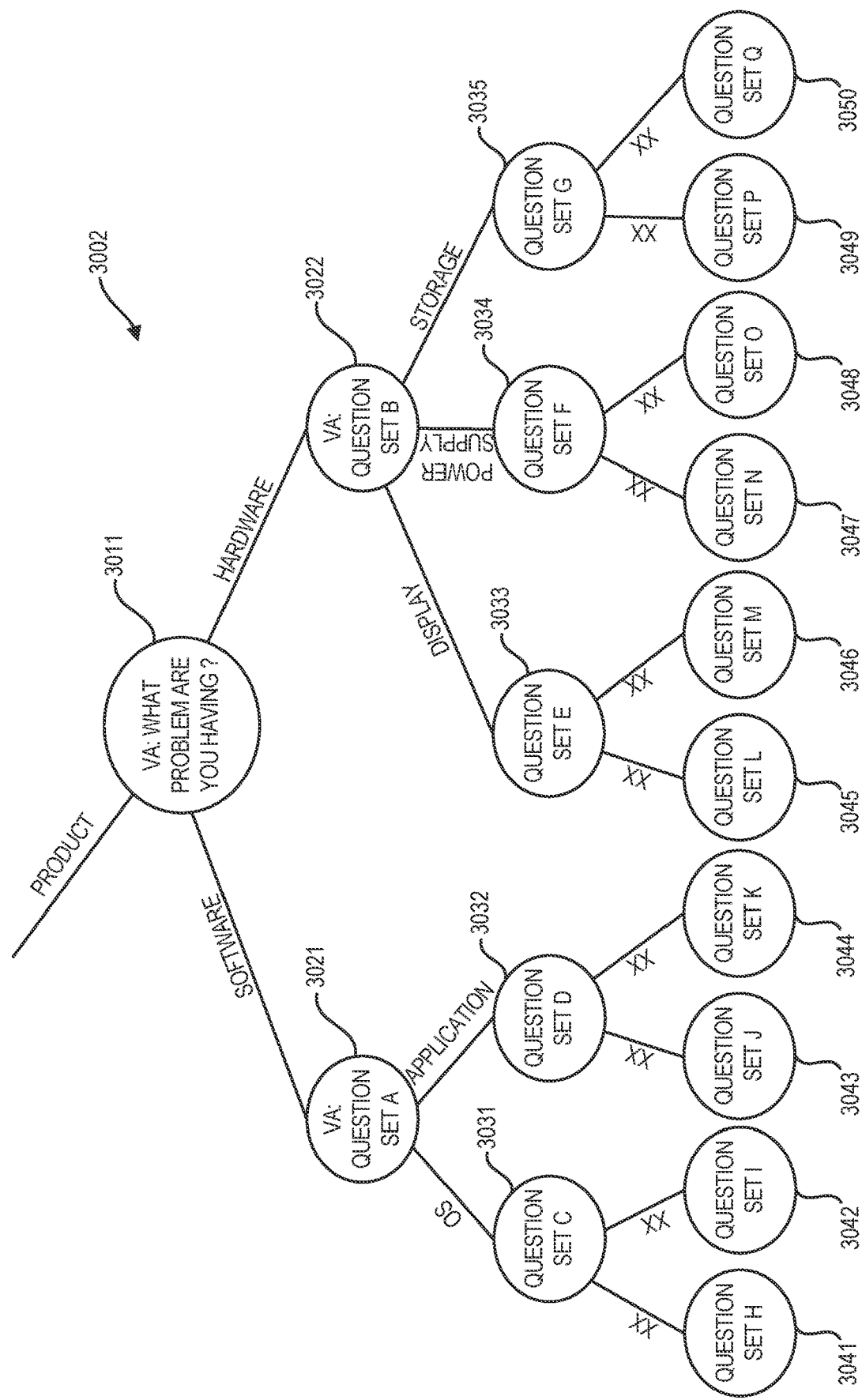
FIG. 5 depicts a decision data structure provided by a decision tree according to one embodiment.

At block 1206, VM 120 can perform asset data queries for use in determination of a voice data message (block 1207) to a user by a VA. Various approaches can be used for determination of a responsive voice message including e.g. direct dialogue, or mixed dialogue. VM 120 can query asset data for return of e.g. software library file data and database file data. In the process of performing asset data queries at block 1206 of both storage system 150 and storage system 250, VM 120 can be subjecting queried asset data to memory caching so that for the time certain asset data is memory cached into system memory, VM 120 can avoid re-access of the certain asset data from storage system 150 or storage system 250. VM 120 can perform access queries of assets stored on storage system 150 and/or storage system 250. For support of functions for current IVR session assets queried can include software library e.g. software library files, database files and other files. Where an asset is not been stored locally in storage system 150 VM 120 can query storage system 250 which can be an external and remote storage system. Thus, the flowchart of FIG. 3B depicts asset data returned from VM 220. With asset data received VM 120 at block 1207 can perform an AI response decision. In one aspect, VM 120 can use a decision tree for determination of data assets to query and for return of decisions as to VA voice data responses. For performing block 1206 and 1207, VM 120 can use in one aspect decision tree as set forth in FIG. 5. At block 1207, VM 120 can return an AI response decision, i.e. can determine a response for presentment by a VA to the user that is intelligently generated based on most recently received voice data of a user sent at the most recent iteration of block 1002. In one aspect, VM 120 can reference a decision tree an example is shown in FIG. 5 for return of an AI response decision. A segment of a decision tree for activation after an initial greeting transaction is shown in FIG. 5. The decision tree of FIG. 5 can control the flow of conversation between a $V_A$ and a user in a customer service scenario. In reference to FIG. 5, nodes represent questions of a $V_A$ and edges between nodes defined IVR session states which can be determined by IVR application instance 130 by way of examining responses of a user to VA questions. VM 120 can be configured to reference a decision tree such as decision tree 3002 for return of an action decision as to the next VA question to present to a user participating in a current IVR session. For the state indicated that the edge entitled "product" a VA voice response can be predetermined is depicted by node 3011 which designates the VA response of "What problem are you having?" In other scenarios such as indicated by the states referenced by the edges entitled "software" and "hardware", the response of a VA can be selected from a menu of candidate question sets, e.g., the question set A for node 3021 or the question set B for node 3022. According to one embodiment, VM 120 can select a question from a set of candidate questions in dependence on various factors including e.g. a personality profile maintained by system 1000 for respective users of system 1000. In response to completion of block 1207 VM 120 can proceed to block 1208. At block 1208, VM 120 can send VA voice data in accordance with the AI response decision of block 1207 for receipt by UE device 10A. The user can respond with next voice data of a user at send block 1002, which can be received by VM 120 at block 1204 during a next iteration of block 1204. It should be noted that in some embodiments a large variety of decision trees can potentially activated by VM 120 in response to certain received voice data of user. In the middle of an IVR session a first decision tree can be deactivated and a second decision tree can be activated in response to certain voice data of a user. Decision tree 3002 can include nodes 3011, 3021-3022, 3031-3035, 3041-3050 mapping to VA voice response generation functions and edges between the nodes.

With a voice data response determined at block 1207 VM 120 can proceed to block 1208. At block 1208 VM 120 can send responsive voice data to the user for receipt and playback by UE device 10A. Voice data sent at block 1208 can be voice synthesized voice data presented by a virtual agent VA. On performing block 1208 VM 120 can proceed to block 1209. At block 1209, VM 120 can perform an asset data determination process to determine asset data to be subject to an action decision for asset data prioritization. For performing block 1209 VM 120 can apply Eq. 2 as follows.

$$TS = F_1 W_1 + F_2 W_2 + F_3 W_3 + F_4 W_4 + F_5 W_5 + F_6 W_6 + F_7 W_7 \quad \text{(Eq. 2)}$$

Where TS is a strength score applied by VM 120 to a candidate topic, $F_1$ is a first factor, $F_2$ is a second factor $F_3$ is third factor, $F_4$ is fourth factor, $F_5$ is fourth factor, $F_6$ is sixth factor, $F_7$ is seventh factor $W_1$-$W_7$ are weights associated the various factors $F_1$-$F_7$. VM 120 can be configured to apply Eq. 2 to each of a plurality of candidate topics. Eq. 2 can be configured similarly Eq. 1. VM 120 can use Eq. 2 in the manner of use described for Eq. 2. VM 120 can score respective topics of a plurality of candidate topics using Eq. 2 to provide an ordered list of topics. VM 120 can then use the topic scores for return of an action decision. The action decision can specify an adjustment in accessing of asset data. VM 120 using Eq. 2 can determine strength scores associated with various candidate topics. The candidate topics can include an aggregate of all topics identified under factor $F_1$-$F_7$. Strength score, T, can provide a prediction that a candidate topic will be present in the current IVR session at a time during the session subsequent to the current time, with larger valued scores indicating that the subsequent occurrence is more likely. VM 120 can use Eq. 2 to determine scores for plurality candidate topics and can select asset data for subjecting to an adjustment in accessing of asset data by VM 120.

Factor $F_1$ can be a current session factor operating in a manner similar to factor $F_1$ of Eq. 1. VM 120 by IVR application instance 130 at block 1209 can increment a scoring value assigned to a candidate topic under factor $F_1$ from a baseline value where the topic is strongly present in the current IVR session and can decrement a value assigned under factor $F_1$ where the candidate topic is not strongly present in the current IVR session. VM 120 can determine a strength of presence of topic based on a count of identifications of a topic within a session with more recent identifications weighted more heavily. For identification of session topics under factor $F_1$, VM 120 can examine UE device sensor output data including voice data output by an audio input device as well as location data as may be output by a GPS sensor, biometric sensor output data and environmental condition sensor output data. Identified topics identified from voice data can include extracted topics extracted by NLP processing of extracted text as returned at block 1205. Identified topics identified from location, health biometric, of environment condition sensor output data can include topics returned using the decision data structure configured according to Table B.

Regarding factor $F_2$ of Eq. 2, factor $F_2$ can be an historical data factor. Factor $F_2$ can be a current user historical IVR session data factor. According to factor $F_2$, VM 120 can examine historical IVR session data of a user. The prior sessions of the user can include sessions of the product of the current session identified and sessions involving additional topics. For each candidate topic scored using Eq. 2, VM 120 can increment scoring values from a baseline under factor $F_2$ where the candidate topic was identified in prior IVR sessions of the user and can decrement values under factor $F_2$ from a baseline where the candidate topic was not identified in a prior IVR session of the current user. Factor $F_2$ of Eq. 2 can operate in the manner of Factor $F_2$ of Eq. 1.

Factor $F_3$ of Eq. 2 can be an all users historical session data factor for the current product. According to factor $F_3$, VM 120 can examine historical session data for all users of system 1000 for IVR sessions in which a product of the session is in common with the current product of the current IVR session. VM 120 can increment values under factor $F_3$ for a candidate topic where a common candidate topic was strongly present (e.g. as can be determined from a count of identifications) in the prior IVR sessions for all users and can decrement a value under factor $F_3$ where the candidate topic was weakly present and/or not present in the historical IVR sessions of all users. The use of factor $F_3$ defines use of crowdsource data for return of an AI action decision. Factor $F_3$ of Eq. 2 can operate in the manner of factor $F_3$ of Eq. 1.

Regarding factor $F_4$ of Eq. 2, factor $F_4$ can be a non-session behavior history factor of the current user. For a candidate topic, VM 120 can increment values under factor $F_4$, where the candidate topic is strongly present in historical behavior data of the user and can decrement a value under factor $F_4$ where the candidate topic is weakly present and/or not present in historical behavior data of the current user. Behavior data can include non-IVR session behavior data under factor $F_4$ can include, e.g. shopping history data of the user, e.g. live shopping history data or online shopping history data of the user, as can be determined from examination of data from UE device 10A (e.g. location data based on stores visited or online shopping history as can be determined by examination of a user's online browsing history available from UE device 10A). Topic extraction can be performed by activation of NLP process 133 running on VM 120 to process product specifications of products subject to browsing by a user. Factor $F_4$ of Eq. 2 can operate in the manner of factor $F_4$ of Eq. 1. Non-IVR session behavior history data under factor $F_4$ can include data derived by examination of social media account data of a user. For example, VM 120 can be configured to iteratively, during the deployment period of system 1000, examine data of social media system 500 to subject, e.g. posts data and message data of a user to extract topics of positive interest or negative interest to the user. Topic extraction can be performed by activation of NLP process 133 running on VM 120 to process social media data posts data and/or message data. Factor $F_4$ of Eq. 2 can operate in the manner of factor $F_4$ of Eq. 1.

Factor $F_5$ of Eq. 2 can be a state factor. VM 120 for assigning values under factor $F_5$ can examine state data of the current IVR session as described in connection with the decision tree of FIG. 5. In another aspect of the decision tree of FIG. 5, there can be associated to the various nodes and edges of FIG. 5 asset references that reference the assets used for support of discrete states of an IVR session. Further, as noted in reference to Table D topics can be associated to respective assets within table data defining topics area 145 of data repository 140 for use by VM 120. Using Table D data and asset data associated to a decision tree, VM 120 can associate topics to the various nodes of s decision tree as shown in FIG. 5. According to factor $F_5$, VM 120 can increment values under factor $F_5$ from a baseline value where a candidate topic is associated to a node downstream from a current state defined on a decision tree and decrement values under factor $F_5$ from a baseline value if a candidate topic is not associated to a decision tree node downstream from a current state. Referring to FIG. 5 consider the case the current state is the state indicated by the edge between nodes 3022 and 3034. In such a situation VM 120 can increment candidate topic scoring values under factor $F_5$ where the candidate topic is associated to node 3047 or 3048 and can decrement topic scoring values under factor $F_5$ where the candidate topic is not associated to node 3047 or 3048.

Factor $F_6$ of Eq. 2 can be a query factor. VM 120 under factor $F_6$ can examine asset query data of VM 120. VM 120 according to factor $F_6$ can examine topics associated to assets queried by VM 120 during performance of an IVR session as recorded into Table D data herein. Assets subject to query can include e.g. software library file data and database file data. VM 120 can increment values under factor $F_6$ where a candidate topic being evaluated matches a topic of assets strongly queried by VM 120 during a current IVR session and can decrement values under factor $F_6$, where the candidate matches a topic of assets not strongly queried during a current IVR session. VM 120 according to factor $F_5$ can determine whether assets are strongly queried or not strongly queried based on a count of queries, with queries occurring more recently in time being weighted more heavily.

Figure 6:
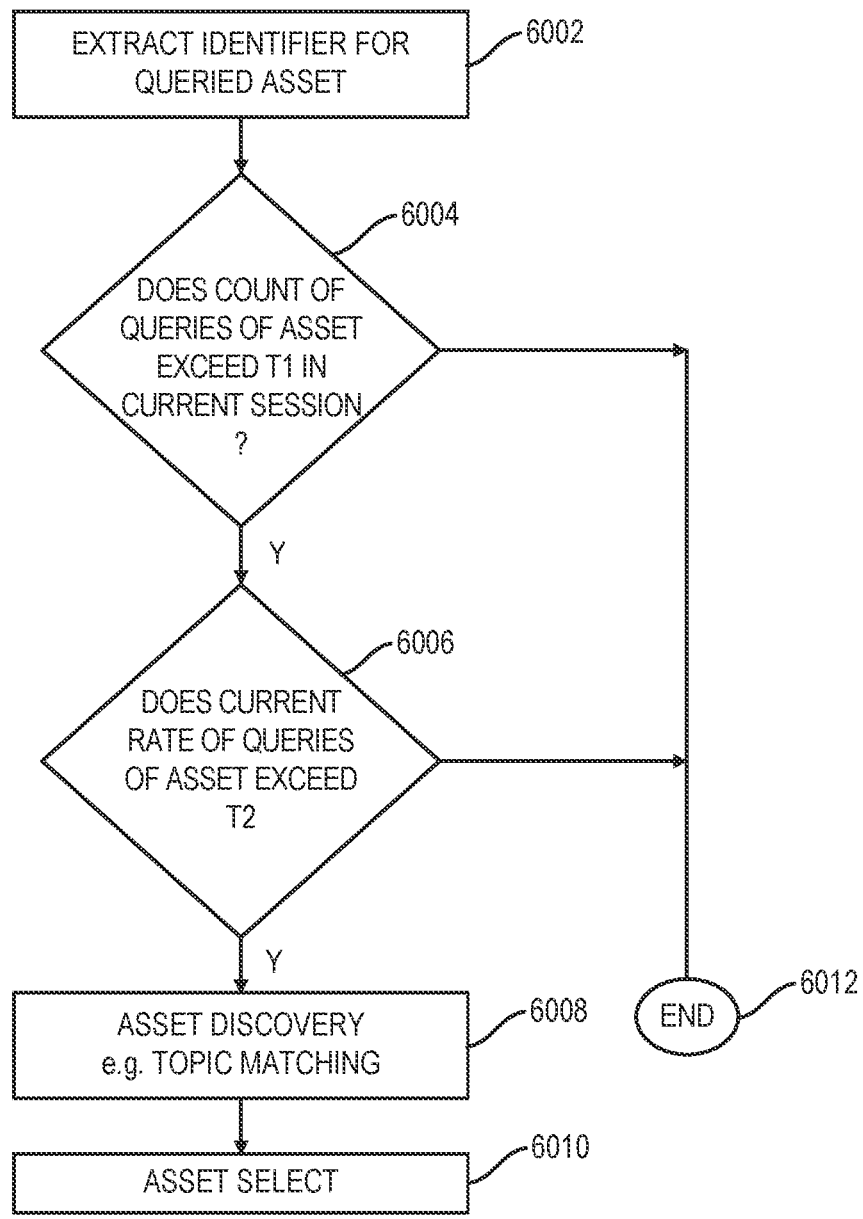
FIG. 6 depicts a process for performance by a computing node according to one embodiment.

VM 120 can increment values assigned to certain candidate topics under factor $F_6$ using the process of the flowchart of FIG. 6. VM 120 can perform the process of FIG. 6 at each iteration of block 1209 according to one embodiment. At block 6002, VM 120 can extract an identifier for a queried asset currently being queried during the current iteration of block 1209. The queried asset can be an asset of storage system 150 or storage system 250. At block 6004 VM 120 can determine whether a count of queries of the resource identified at block 6002 during the current IVR session exceeds a first threshold, T1. At block 6006, VM 120 can determine whether a current rate of queries of the asset identified at block 6004 (e.g. in queries per second) exceeds a second threshold, T2. If the determinations of block 6004 and block 6006 are both true VM can proceed to block 6008 to examine asset topic data as represented in Table D to identify a topic associated to the strongly queried asset as determined at decision block 6008. At block 6010 VM 120 can examine Table D to identify remaining assets of data repository 240 having a topic in common with the topic identified at block. If a current candidate topic being evaluated using Eq. 2 is identified at block 6008 of FIG. 6, VM 120 at block 1209 can increment an assigned scoring value under factor $F_6$ in dependence on the aggregate size of file data identified at block 6010 with scoring values for a first candidate topic having a first associated aggregate file data size being incremented more significantly than a second candidate topic having an second associated aggregate file data size less than the first file data size.

Factor $F_7$ can be trends factor in dependence on data of a current IVR session and historical sessions. According to factor $F_7$, VM 120 can assign topic strength scoring values using output data from one or more predictive model, where the one or more predictive model has been trained using training data sets that comprises data from past IVR sessions mediated by system 1000. Referring to FIG. 7A, predictive model 7002 is a predictive model for predicting topics observable at a next time $T_{N+1}$ based on a current state and topic observed within a current IVR session. Training data for training predictive model 7002 can include a plurality of iteratively applied training datasets. A training dataset for training predictive model 7002 can include a state and topic associated to time $T_N$ and topic associated to a next time period $T_{N+1}$. A plurality of training datasets can be applied to predictive model 7002 for training predictive model 7002. Training datasets can be taken from plurality of IVR sessions. According to one embodiment, first instance of predictive model 7002 can be trained using training data specific to the current user. In another example, an instance of predictive model 7002 can be trained using training data of IVR sessions associated to all users of system 1000. With training data applied as described predictive model 7002 can learn a relationship between current topic and state and a next topic and state. Predictive model 7002 once trained can be responsive to query data which can include a current state associated to a current topic. VM 120 according to factor $F_7$ can increment values under factor $F_7$ where a candidate topic being evaluated matches a predicted next topic predicted based on query data applied to predictive model 7002.

Predictive model 7004, shown in FIG. 7B, can be trained to predict a relationship between current state an asset queried from storage system 150 or storage system 250 in relation to a predicted next topic at a next time, $T_{N+1}$. Training data applied to predictive model 7004 can include iteratively applied training datasets. The training data sets can include state and assets queried at time $T_N$ associated to a topic at time $T_{N+1}$. The training datasets can be taken from historical sessions mediated by system 1000. A first instance of predictive model 7004 can be trained with training data specific to the current user. Another instance of predictive model 7004 can be trained with use of training data associated to all users of system 1000. Trained with use of training data as described predictive model 7004 can predict next topic observable in a current IVR session in relation to a current state and asset query of a current IVR session. Predictive model 7004 once trained can be queried with a query that includes a current state and asset queried. VM 120 can increment topic strength values assigned under factor $F_7$ where current candidate topic being evaluated matches a predicted next topic output by predictive model 7004 and can decrement topic strength scoring values under factor $F_7$ where a candidate topic being evaluated does not match predicted next topic predicted by predictive model 7004.

Predictive model 7006 shown in FIG. 7C can return a prediction as to a next asset of storage system or storage system 250 during a current IVR session based on a current state and asset query of a current IVR session. Training data for use in training predictive model 7006 can include iteratively applied training datasets. Training datasets for training predictive model 7006 can include training data taken from historical IVR sessions mediated by system 1000. A training dataset for training predictive model 7006 can include a state and asset queried by an VM 120 at time $T_N$ in association with an asset queried at a next time, $T_{N+}1$. A first instance of predictive model 7006 can be trained using training data specific to a current user and a second instance of predictive model 7006 can be trained using training data of all users of system 1000 i.e. using crowdsourced data. Predictive model 7006 once trained can predict a next asset queried by VM 120. Query data for query of predictive model 7006 can a current state of an IVR session in association with a current asset query performed by VM 120. VM 120 can increment a value assigned to a candidate topic under factor $F_7$ from a baseline value where the candidate topic being evaluated matches a topic associated to a predicted next asset query output by predictive model 7006 and can decrement a value assigned under factor $F_7$ from a baseline value when a current topic being evaluated does not match a topic associated to predicted next asset query output by predictive model 7006. The training data used for training predictive model 7002 predictive model 7004 and 7006 can include training data of historical IVR sessions mediated by system 1000 as well, as training data taken from a current IVR session At block 1209 VM 120 can use Eq. 2 for scoring topics and can return an action decision to prioritize certain asset data of one or more storage system of system 1000. The certain asset data can include asset data for use by VM 120 in generating VA responses. VM 120 scoring candidate topics can include VM 220 returning an updated ordered list of candidate topics predicted to be observed in a current IVR session as set forth in Table C. VM 120 can perform selection of certain asset data for prioritizing using the scoring and/or ranking of topics as depicted in Table C iteratively updated at block 1207. VM 120 for example can select certain asset data for prioritization based on topics of the certain asset data having threshold exceeding strength scores. VM 220 for example can select certain asset data for prioritization based on the certain asset data having associated topics ranked in a top threshold percentage of topics ranked by strength as set forth in Table C. Prioritizing asset data can include prioritizing asset data in dependence on the topic scoring as depicted in Table C, and therefore in dependence on the obtained data used to generate topic scores. System 1000 prioritizing certain asset data of one or more storage system, e.g. storage system 150 and/or storage system 250 can include e.g. (a) receiving certain asset data for storage caching into a local storage system local to VM 120 for fast access by VM 120 local to storage system 150, (b) adjusting a tiering of storage volumes for storing certain asset data, and/or (c) adjusting a searching prioritization of certain asset data. For performing (a) VM 120 can communicate with VM 220 to retrieve selected asset data e.g. asset data associated topics having strength scores exceeding a threshold not already stored in local storage system 150. For performing (b) VM 120 can send a command communication to storage controller 154 and/or storage controller 254 to adjust tiering of storage so that storage of selected asset data is in accordance with a current order of topic strength scoring e.g. so that assets associated to higher scored topics are assigned to higher tiered storage. For performing (c) VM 120 can send a command communication to storage controller 154 and/or storage controller 254 to adjust a search prioritization e.g. so that assets associated to topics are subject to searching in an order dependent on the current order of ranking of candidate topics as set forth in Table C with assets associated to a topic having a first score being searched prior to assets associated to a second score where the first score is greater than the second score.

At block 1210, VM 120 can request and receive slice data. At block 1210 VM 120 can also be receiving performance metrics data from UE device 10A as indicated by send block 1002. The performance metrics data can include KPI performance metrics specifying the performance of UE device 10A and KPI performance metrics specifying the performance of the network slice(s) being participated in by UE device 10A. VM 120 at block 1210 in addition to receiving metrics data from UE device 10A can also be receiving performance metrics data from VM 120 which can be self generating metrics data specifying the performance in terms of KPIs of VM 120, and network slices currently participated in by VM 120 for support of a current IVR session. In response to the receipt of the described slice data and metrics data VM 120 can proceed to slice decision process block 1211.

At block 1211 VM 120 can perform a slice decision process to return a slice action decision. Received slice data received in response to the slice data request at block 1210 can include data on network slices of system 1000 including data and slice availability and specified parameter values of available slices. At slice decision process block 1211 VM 120 can determine whether slices in use and facilitating a current IVR session should be subject to parameter value adjustment. At block 1211 VM 120 can determine whether a slice such as slice $S_A$, slice $S_B$, or slice $S_C$ should be subject to slice parameter value adjustment to improve performance of a current IVR session. For return of an action decision at block 1211, VM 120 can examine asset data identified for asset data pulling from storage system 250 at asset data determination process block 1209. For example, VM 120 using Table D can examine size data and type data of assets identified for pulling. For example, VM 120 at block 1211 can ascertain that asset data of the threshold exceeding size is to be pulled from storage system 250 and accordingly can return an action decision at block 1211 to change one or more slice parameter value e.g. increase a bandwidth parameter value associated to slice $S_A$ as described in FIG. 2. VM 120 at block 1211 can examine the type classification of an asset selected for an asset data pull at block 1209. VM 120 examining Table D can determine based on the selection of multimedia asset data for an asset data pull that a subsequent time period of a IVR session can include a multimedia exchange between VM 120, and UE device 10A. Accordingly, VM 120 can return an action decision at block 1211 to increase a bandwidth parameter value associated to the slice generically depicted as slice $S_C$ facilitating communication between VM 120, and UE device 10A as described generically in FIG. 2.

In some scenarios VM 120 at slice decision process block 1211 can determine that a current slice facilitating a current IVR session, e.g. slice a slice facilitating a current IVR session is not appropriate for subjecting to parameter value adjustment. For example, slice registry 270 can specify limits on parameter value adjustments available for specified slices as reported by slice orchestrator 400.

According to one aspect, VM 120 during the course of an IVR session can be using the decision data structure as set forth below in Table E which cognitively maps topics to sensitivity levels of topics.

TABLE E

| Row | Topic | Sensitivity level |
|---|---|---|
| 1 | Football championship | 0.1 |
| 2 | Cooking recipe | 0.2 |
| 3 | Video game | 0.3 |
| 4 | Medicine | 0.8 |
| 5 | Financial investment | 0.8 |
| ... | ... | ... |

Referring to Table D, certain topics can be assigned higher sensitivity values than other topics. For example, referring to the decision data structure of Table D topics such as financial investment and medicine can be assigned higher sensitivity than other topics such as entertainment related topics. At slice decision process block 1211 VM 120 can be examining a current sensitivity level associated with a current IVR session. VM 120 can be tracking a sensitivity level of a current IVR session based on sensitivity levels assigned to identified topic. According to one embodiment, VM 120 can be aggregating sensitivity levels for each topic identified for a current IVR session. Aggregating can include e.g. providing a straight average of values or a weighted average where more recent values are weighted more heavily. Based on a tracked sensitivity level exceeding a threshold, VM 120 according to one embodiment can return an action decision at block 1211 to change a security value parameter setting of a slice facilitating traffic from VM 120 to UE device 10A (slice $S_C$ FIG. 2) from security=0 (multi-tenant) to security=1 (single tenant). According to one scenario, VM 120 examining slice data received in response to block 1211 can determine that a new slice is needed (the current slice for slice $S_C$ can be tagged as restricted to multi-tenant in the slice data). Accordingly, VM 120 at block 1211 can return the action decision to transition to a single tenant slice where a current slice facilitating IVR session is a multi-tenant slice.

In another aspect, VM 220 performing slice decision process at block 2206 and VM 120 performing slice decision process block 1211 can include VM 220 and VM 120 querying predictive model 7010. Predictive model 7010 depicts a predictive model trained with use of iteratively applied training datasets, wherein the iteratively applied training datasets can include historical data of all IVR sessions participated in by all users of system 1000. Respective training datasets for training predictive model 7010 can include historical IVR session data that includes (a) state and slice parameter value(s) for a certain session associated to (b) subsequent performance metrics data for the slice for the certain session. Performance metrics data can include average packet loss rate metrics data. System 1000 can train different instances of predictive model 7010 for each of the current slice for slice $S_A$, slice $S_B$, and slice $S_C$ described generically in FIG. 2. Predictive model 7010 with applied training data is able to understand how a particularly configured slice is expected to perform during an IVR session after a particular state is reached. Thus, predictive model 7010 can be trained to learn of states that can trigger changes in slice requirements. Predictive model 7010 once trained can respond to query data provided by a current state and current slice parameter value(s) with an output that specifies the predicted subsequent performance metrics of the current slice. VM 220 and VM 120 can be configured to modify slice selection data sent at block 2206 and block 1212 in the case that query of predictive model 7010 indicates that a current network slice for slice $S_A$, slice $S_B$, and slice $S_C$ as described generically in FIG. 2 is predicted to exhibit deficient performance.

On completion of block 1211, VM 120 can proceed to block 1212. At block 1212, VM 120 can send slice selection data to NSMF 260. The slice selection data can include selection data to adjust a parameter value of a current slice currently facilitating communication in the current IVR session and or slice selection data to select a new slice for facilitating communication in the current IVR session. NSMF 260 on receipt of the slice selection data can perform slice adjusting at block 2605 where the slice selection data specified slice parameter value adjusting. Where the slice selection data specifies providing a new one or more slice for use in facilitating a current IVR session, NSMF 260 at one or more of blocks 2606, 2607, and/or 2608 can send appropriate slice credential data (e.g. including a slice identifier) to one or more of UE device 10A, VM 120, VM 220, or VM 320 so that the referenced nodes can participate in any new slices provided for facilitating data communication in a current IVR session. At slice adjusting block 2605, NSMF 260 can communicate with control plane orchestrator 400 so that control plane orchestrator 400 with use of NFV functionality and SDN functionality of core computing environment 200 and/or edge computing environment 100A can enforce the requirements of the slice parameter value adjusting. In the case that slice selection data sent at block 1212 specifies selection of a new slice, NSMF 260 at blocks 2606, 2607, and 2608 UE device 10A, VM 120, VM 220 (and possibly VM 320) to facilitate participation of these nodes in any newly selected slice specified in the sliced selection data sent at block 1212.

Referring further to the flowchart of FIGS. 3A-3B VM 120, with network slices subject to parameter value adjusting and/or replacement, can proceed to block 1213. At block 1213 VM 120 can send an asset data pull request from VM 120 based on an action decision returned at block 1209 and VM 120 can responsively send requested asset data from storage system 250 to VM 120 for storage caching into storage system 150 shown in logical form view by data repository 140. VM 120 at block 1213 in addition to or alternatively to sending an asset data pull request can perform (b) adjusting a tiering of storage volumes for storing selected asset data, and/or (c) adjusting a searching prioritization of selected asset data to the action decision returned at block 1209.

At block 1214 VM 120 can determine whether current IVR session has been terminated. An IVR session can be terminated e.g. by user of UE device 10A closing the conversation engaged in by a by a VA presented by VM 120. Where a current IVR session has not been terminated, VM 120 can iteratively return to block 1204 were VM 120 iteratively receives new voice data and other sensor data sent by UE device 10A at block 1002. UE device 10A can be iteratively be performing the loop of block 1002-1004 and UE device 10A can exit the loop of block 1002-1004 when a current IVR session has been terminated. It can be seen from the flowchart of FIGS. 3A and 3B, that VM 120 can iteratively perform blocks 1208-1214 for a time a current IVR session is active. While VM 120 can be iteratively performing blocks 1208-1214 UE device 10A can be iteratively sending voice data and other sensor data for processing to VM 120 on an iterative basis in response to new VA generated voice data iteratively sent at block 1208. VM 120 can iteratively perform blocks 1204 to block 1214 during a current IVR session until a current idea of our session is terminated. Accordingly, it can be seen that VM 120 can be iteratively receiving and processing new sensor data from a user, which sensor data can include voice data and other sensor data of a user iteratively until the current IVR session is terminated. The other sensor data other than voice data of the user can include e.g. location data, health biometric sensor data location data and/or environmental condition sensor data indicating e.g. external temperature data, humidity data, barometric pressure and the like.

It can be further seen in reference to the loop of blocks 1204-1214 that VM 120 can be iteratively during a current IVR session prioritizing storage system asset data for use in generating responses by a VA, and can iteratively be generating new slice selection data that specifies adjustments slice parameter values and/or new slices. The iterative prioritizing of asset data and the iterative generating of slice selection data can be performed dynamically in dependence on new data iteratively obtained by system 1000 during a current IVR session, including new sensor data obtained from UE device 10A, and or historical data of one or more user. The iterative prioritizing of asset data and the iterative generating of slice selection data can be dependent in one embodiment on the iterative extraction of topic data extracted with use of sensor data received from a UE device 10A, historical session data of one or more user, and/or historical non-session data of one or more user.

Weights associated to factors of Eqs. 1 and 2 can be adjusted over time using reinforcement machine learning processes. After each IVR session, VM 220 can examine performance data of VM 120 to examine external asset data queries of VM 120 on storage system 250 eternal and remote from storage system 150 for access of asset data of storage system 250 and can further examine asset data queries by VM 120 on storage system 150. VM 220 can increment an IVR session performance score from a baseline value in the case a count of queries for asset data on storage system 250 is below a low threshold (the asset data in a well-functioning system can be previously subject to storage caching in storage system 150) and can decrement an IVR performance score of a current IVR session in the case a count of queries for asset data on storage system 250 is above high threshold. In response to return of a positively scored IVR session, VM 220 can retain and reinforce weights associated to Eqs. 1 and 2. In response to return of a negatively scored IVR session, VM 220 can adjust weights of Eqs. 1 and 2. Over time, by the described reinforcement machine learning processing, the weights associated to Eqs. 1 and 2 can converge on weights producing a well-performing system, in which asset data queries by VM 120 in storage system 250 of core computing environment 200 are minimized. On termination of an IVR session, VM 120 can accumulate data collected during a current IVR session and can send the accumulated session data to VM 220 into storage system 250 represented in logical view form by data repository 240. Intermediate of IVR sessions, various data expected for a subsequent IVR session hosted within edge computing environment 100A can be iteratively pushed into storage system 150 local to VM 120. Data iteratively pushed by VM 220 to storage system 150 represented in logical view form by data repository 140 can include, for example, data of topics area 245 which can be iteratively pushed into topics area 145 local to VM 120 on an iterative and ongoing basis so that data of topics area 145 is iteratively updated for use in return of action decisions by VM 120.

Assets identified for prioritization at block 2203 and 1209 can include assets other than those assets having topics predicted to be observed subsequent to a current time in a current IVR session. According to one embodiment, VM 120 can be configured to extract meaning from voice data received from UE device. According to one embodiment VM 120 can be configured to recognize times of interest for product events based on voice data received from user. Predictive model 7008 as shown in FIG. 7D can be trained to predict a time of interest for a product event based on query data which comprises a current text string of a user as converted from voice data by speech to text processing. Predictive model 7008 can be trained with use of iteratively applied training datasets by supervised machine learning where the respective training datasets include (a) a text string phrase, and (b) meaning of the text string phrase. For example, applied training dataset for training predictive model 7008 can include such text strings and "it broke" associated to meaning="product problem", "it crashed" associated to meaning="product problem", "it died" associated to meaning="product problem", and so on. Trained as described, predictive model 7008 once trained can respond to the query data text string "it crashed" with the extracted meaning of meaning="product problem". Another instance of predictive model 7008 can be trained to output time periods of interests in response to query data which comprises a text string phrase. Iteratively applied training datasets can include (a) a text string phrase, and (b) a time period of interest. Exemplary training datasets for training the described can include e.g. "the last two days" associated to meaning="from 24 hours ago to the current time", "over the last 24 hours" associated to meaning="from 24 hours ago to the current time, "about two weeks ago" associated to meaning="from 356 hours ago to 316 hours ago". Predictive model 7008 once trained can respond to query data to extract a time period of interest from user text strings as extracted by speech to text processing of voice data of a user. According to one embodiment, both described instances of predictive model 7008 can be always active during a current IVR session. VM 120 can be configured so that all voice data received from a user can be extracted to a text string that is input as query data to the first instance of predictive model 7008 and the second instance of predictive model 7008, to detect references to product events (product problems in the described scenario) and time periods of interest. VM 220 (or VM 120) at block 2203 and VM 120 at block 1209 can be configured to ascertain that that a product event is associated to a certain time period interest when the text string triggering identification of the product event and the text string triggering identification of the time period interest are less than a threshold number of words apart. VM 220 (or VM 120) at block 2203 and VM 120 block 1209 on determining based on the described processing that a product event has occurred at an identified interest can select certain asset data for prioritization. For selecting certain asset data for prioritization, VM 220 and/or VM 120 can examine Table D and can select all asset data of Table D stamped with creation timestamps of within the identified time period as asset data for prioritization.

System 1000 prioritizing asset data for use in generating VA voice data can include e.g. (a) receiving asset data for storage caching into a local storage system local to VM 120 for fast access by VM local to storage system 150, (b) adjusting a tiering of storage volumes for storing asset data, and/or (c) adjusting a searching prioritization of asset data. For performing (a) in the case asset data selected for prioritization is asset data timestamped within a time period of interest VM 220 can communicate with VM 120 so that the selected asset data is pushed for storage caching into storage system 150 or VM 120 can communicate with VM 220 to pull the selected timestamped asset data for storage caching into storage system 150. For performing (b) VM 220 or VM 120 can send a command communication to storage controller 154 and/or storage controller 254 to adjust tiering of storage so that storage of the selected timestamped asset data is subject to re-tiering to a higher storage tier. For performing (c) VM 120 can send a command communication to storage controller 154 and/or storage controller 254 to adjust a search prioritization e.g. so that the selected timestamped asset data stamped with timestamps within the time period of interest are subject to earlier search. According to one embodiment, a storage volume controller can prioritize searching of certain selected asset data by moving the selected asset data into a certain storage volume among storage volumes (tiered or not tiered) and assigning priority of searching to the certain storage volume.

Various available tools, libraries, and/or services can be utilized for implementation of predictive model 7002, predictive model 7004, predictive model 7006, predictive model 7008 and/or predictive model 7010. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 7002, predictive model 7004, predictive model 7006, predictive model 7008 and/or predictive model 7010 can include use of e.g. support vector machines (SVM), Bayesian networks, neural networks and/or other machine learning technologies.

There is set forth herein embodiments for enhanced data alignment mechanism in 5G telecom network based on the analysis of user and VA conversation. Embodiments herein can feature sub-classification of data based on user responses and can include reclassifications of data to focus on a mentioned problem to resolve it with efficiency. This mechanism collects the speech and extracts special topics including keywords to align the data accordingly and pulls the inferred important data to edged servers for faster access. There is set forth herein data collection from content delivery network that provides an efficient way to control media data to be delivered based on time, situation and nature with knowledge of a peripheral environment.

Embodiments herein can include an apparatus to work with the 5G service orchestration layer and can include a virtual agent (VA) communicating with the orchestration layer which observe, collect the real-time information from the VA and customer communication and perform dynamic data alignment based on the user response relieved. Based on the system design the overall VA cycle to find the suitable data on the edge can be improved.

Embodiments herein can track communication between client and VA and can responsively align the data for improved fetching. Embodiments herein recognize that virtual agents can be used to interact with customers for the account related queries and transactions. A virtual agent (VA) can work as a representative of an enterprise and collaborate with a customer user. In the telecommunications and mobility domain, there are multiple users which have dissimilar requests and queries which has to be addressed by the telecom service provider. With the advancement in the telecom sector, there are many variables are introduced in the user demands and supply cycle. These include bandwidth requirements, data requirement and other management items including roaming data access and charging.

Embodiments herein can track the communication of virtual agent and customer, detect the speech based and other inputs using a socket based collection mechanism, extract topics including topics mapping to a product and topic keywords, examines users personal information, history, the nature of people, area, and articulate insights from ongoing communication and dynamically aligns the user data. Based on the information received from the user during the communication, embodiments herein can hierarchically align data for support of an IVR session. Embodiments herein can assign priorities to IVR session supporting data and move data to and edge based on the priority assignments. In-bound or out-of-bound device integration mechanisms can be used to collect data from various data resources and to trigger data placement priorities.

Embodiments herein can collaborate with existing IVR systems can provide a dynamic way to automatically align data based on user choices received in the IVR system. According to one scenario, a user may have recently purchased an ACME smartphone and may face a problem of data access in the ACME smartphone. The user may initiate a chat session (or a call session) with VA, and the VA inquires for the problem details as follows. VA: May I know your mobile number and Name User: Rob, 001122334455VA: How can I help You? User: I recently bought an ACME smartphone. (Once VA receives this, it can prioritize ACME smartphone related data) VA: okay User: I am facing issues with data access. It is too slow on my new phone VA: Have you tried any other phone device? User: Yes, it was working good on my older SUPERPHONE smartphone VA: okay. Since when you are facing this problem? User: Since last three days VA: Allow me some time to check. In described communication, when the user references an ACME smartphone, data related to an ACME smartphone can be prioritized and data mining can be performed preferentially with respect to the prioritized data. When the user references "last three days", data unrelated to the last three days can be demoted, and data related to the past three days can be promoted. Asset data supporting an IVR session can be classified based on the user responses which can improve resolution time.

There is set forth herein according to one embodiment a system having ability to collect the activities from the user actions and user communication and dynamically align IVR session supporting data on the dynamically during an IVR session.

There are set forth herein according to one embodiment features to articulate insights of an IVR session and map such insights with a data classifier to select session supporting responsively. There are set forth herein according to one embodiment features to move data to an edge storage system based in the inferred analysis and vice versa once after case resolution completed. To provide this integration, using some in-bound and out-of-bound APIs and interconnect approach. There are set forth herein according to one embodiment features to trace the conversation and accordingly perform data selection operation. There are set forth herein, according to one embodiment, features to perform dynamic featurization of the semi-classified user profile information and select the sub-classified subset based on the communication. There are set forth herein, according to one embodiment, features to prioritize semi-classified and classified user information based on extracted specialized topics including general topics and topic keywords (including product specific words) and generate data subset accordingly. There are set forth herein, according to one embodiment, features to re-classify the data as conversation flows. There are set forth herein, according to one embodiment, features to merge classified subsets if detected in the communication frames. For example, if a user is explaining a problem again if not understood last time, the subsets can be merged until the problem is known. There are set forth herein, according to one embodiment, features to utilize service orchestration of 5G telecom network as a platform for communication across VA and data collector services. There are set forth herein, according to one embodiment, features to integrate the services using 5G infrastructure to provide an application transparent interface. There are set forth herein, according to one embodiment, features to carve the insights and filter data collected to detect the problem faced by user and predict for expected results from the classified subset of data. There are set forth herein, according to one embodiment, features to use a user's audio feed, device camera, and other related inputs like screen touch inputs. There are set forth herein, according to one embodiment, features to use socket based data collection approaches for data pull from client. There are set forth herein, according to one embodiment, features for monitoring of VA based specialized 5G channels (in case any) to obtain a VA's state and information and feed the history to a user profile. There are set forth herein, according to one embodiment, features to manipulate converted speech to text, application information and other related data is sent to the hierarchical or parallel classifier along with the in-scope boundary definition (ex: timelines, privacy statements). There are set forth herein, according to one embodiment, features to trace further interaction from chatbot and client and perform data classification and edge based data pushes or pulls accordingly. There are set forth herein, according to one embodiment, features to integrate and utilize expression maps, phrases used, analyze conversions of input media stream to shape the type of content and to generate metadata accordingly.

According to one embodiment, data can be pre-classified based on the user's communication which results in less time to find the problem solution. Embodiments herein can demote non-relevant information based on communication for improved problem resolution efficiency. Embodiments herein can provide improved data referencing a problem using internal and external status. Embodiments herein can employ dynamic conversation framing for improved problem understanding and faster response. Embodiments herein can manage presence of IVR supporting data to an edge location and can feature data subnetting through IVR traversing.

According to one embodiment, a VA can be loaded as a service in a 5G orchestration layer, which VA can include e.g. configuration setups, interaction frequency and related information via information inquiry interconnect APIs and can initiate a monitoring daemon. Upon session establishment between user and VA, user data can be classified. A system can trace a VA and customer conversation communication. Upon reception of user responses, a system can extract topics including general topics and topics resolving to keywords. Topics can include e.g. product specific phrases. The system can classify objects and infer insights. The system can detect and use weather data classification. The system can perform subnetting based on VA and user response analysis. The system can classify obtained data (including by identifying subsets of original data) in a hierarchical multi-level structure and can use the classification for data fetching. The system can operate so that selected data can be present on nearest node when a VA inquiry to a user is verging to completion. The system can classify and subclassify data dynamically based on the user responses reception, perform actions with respect to a metadata mapper, and update insights story and data hierarchy maps. The system can perform injection of priority re-adjustment and information reframing to obtain knowledge from queries based on a user and VA conversation. The system can wind up an IVR session and auto-learn from the experience.

When user starts the VA communication, in-bound or out-of-bound communication can be established. Upon reception of a communication NIT signal, the system can handshake with the VA and collect user identity to load the user data. The user identity can be an International Mobile Equipment Identity (IMEI) identifier or any unique user identification number that is used to save the user's 360° view. An in-bound communication can trigger an IP based tunnel across the VA service and the IP based tunnel can be used to exchange data streams. When a query is received to the VA service, the information collected as part of query will be supplied to the VA service.

Upon reception of the context of the user query data, semantic analysis can be performed on the sentence to fetch situational insights for the sentence. The importance of a sentence can be examined using topic keywords, phrases used, etc. and user context identification can be performed at a service orchestration layer. Product specific topic keywords, product specific terminologies can be inquired by a VA service. Inquiry by a VA can be performed using an in-bound application program interface (API) infrastructure that can be created over IP tunneling. Alternatively, out-of-bound APIs can be used.

Semantic analysis can be performed using existing techniques to extract meaning of the sentence containing the product specific artifacts and accordingly information can be inferred at a service plane. Input user communication data can be classified to determine user context, and user data can be prioritized. 360° user data can include objects containing the data along with metadata mappers in the classes. The metadata mappers of the user data can be classified based on the user's communication and inferred insights. Example: if user is talking "I had cough yesterday", then at this stage the inferred meanings can include "cough" and "yesterday" and related datasets identified can include "environmental details", "health".

A user and VA data communication can be viewed for articulating insights for the VA session and user query nature and data classifiers can be mapped based on the inferred insights.

Dynamic featurization in 5G services can be enabled for semi-classified user profile information and sub-classified data subset are determined using a user and VA conversation communication. Transferring a user data subset can be performed based on the user's IVR traversing. In response to data classification, a 5G service orchestration can command movement of select data to an edge computing environment from a core computing environment. Movement of data from core computing environment to an edge computing environment can be performed using transparent data migration tunneling across the cloud. A request-response architecture can be used for transfer of data from a core computing environment to an edge computing environment.

Certain embodiments herein may offer various technical computing advantages, involving computing advantages to address problems arising in the realm of computer networks and computer systems. Embodiments herein can include prioritizing asset data based on obtained data such as data of a user associated to a current interactive voice response (IVR) session and/or other users associated to historical IVR sessions. Embodiments herein can include an edge computing node configured to provide an IVR session featuring interactions between a user and a virtual agent (VA). Embodiments herein can include intelligent instantiation of a virtual machine (VM) within an edge computing environment. Embodiments herein can feature intelligent pushing of asset data for support of an IVR session into a storage system local to a computing node responsible for generation of IVR responses by a VA. Embodiments herein can feature intelligent pulling of asset data for support of an IVR session into a storage system local to a computing node responsible for generation of IVR responses by a VA. Embodiments herein can feature intelligent storage caching of received asset data received by a computing node configured to generate IVR responses into a storage system that can be edge disposed and local to the computing node. Embodiments herein can include subjecting received voice data from a user to text-to-speech processing and natural language processing (NLP) to extract topics from voice data of a user. Based on the extracted topics, embodiments herein can include intelligent selecting of asset data for subjecting to prioritization. Prioritization of asset data can include subjecting to storage caching asset data into a storage location local to a computing node that generates IVR responses, re-tiering of asset data, and/or adjusting of a search prioritization by which a computing node searches for asset data. With use of intelligent receipt of asset data from a remote data source, performance of an edge disposed computing node for generating IVR responses for presentment to a user can exhibit improved performance including improved performance characterized by reduced latency. Embodiments herein can provide location based services (LBS) e.g. so that performance of an IVR session can be in dependence on current and/or historical locations of a user. A fundamental aspect of operation of a computer system is its interoperation to which it operates including human actors. By increasing the accuracy and reliability of information presented to human users, embodiments herein increase the level of engagement of human users for enhanced computer system operation. Various decision data structures can be used to drive artificial intelligence (AI) decision making, such as decision data structure that cognitively maps social media interactions in relation to posted content in respect to parameters for use in improved allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 8:
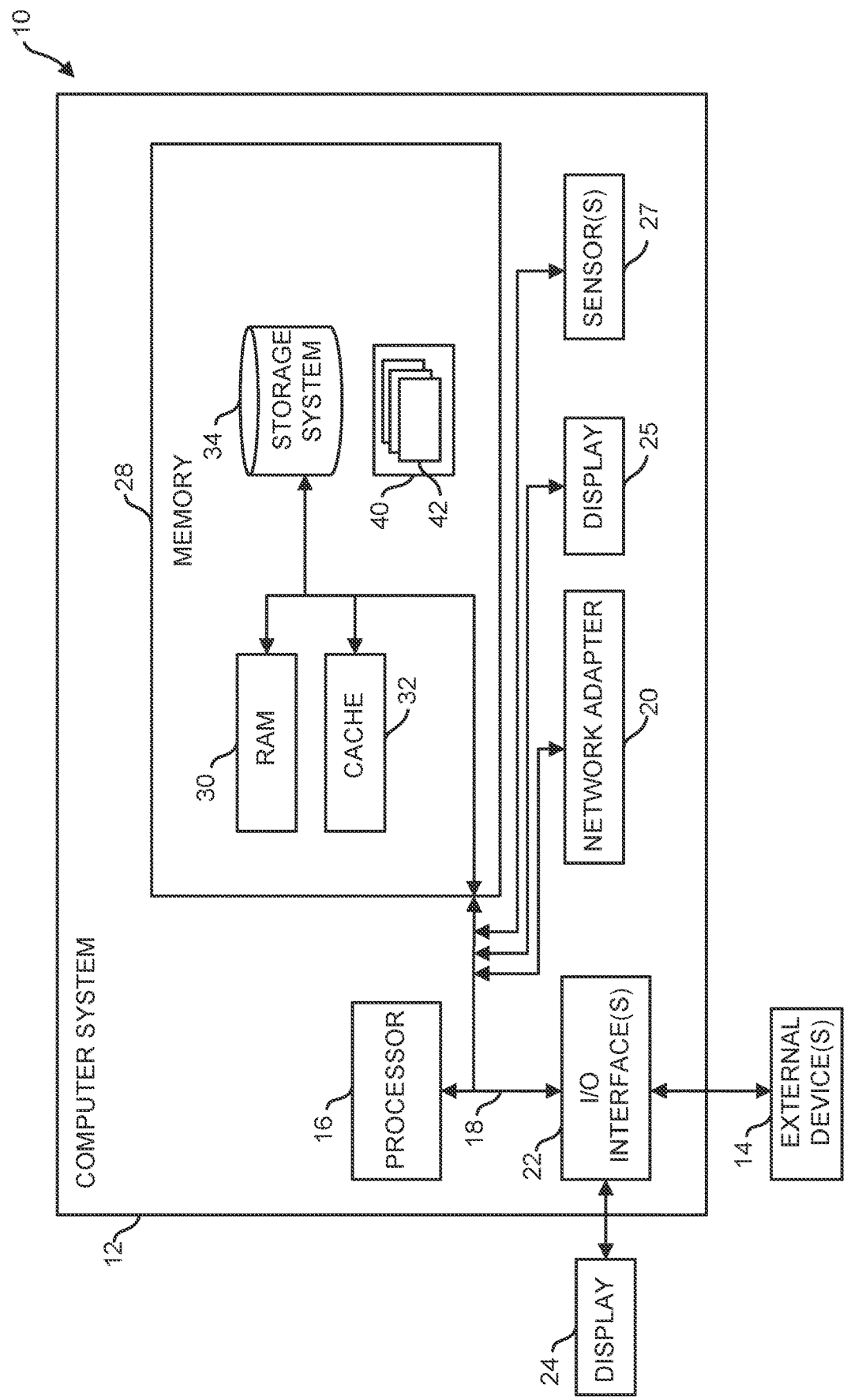
FIG. 8 depicts a computing node according to one embodiment.
Figure 9:
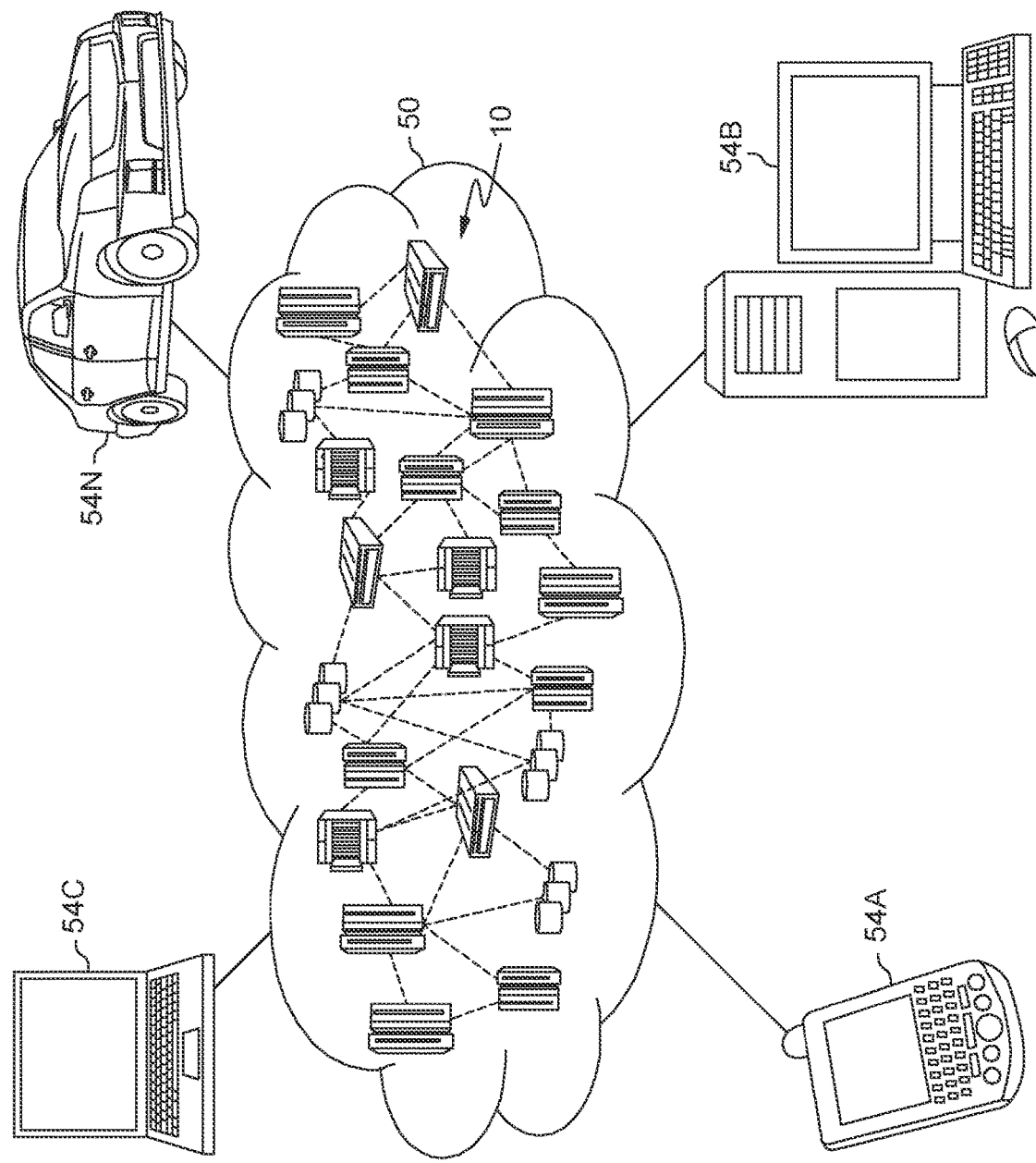
FIG. 9 depicts a cloud computing environment according to one embodiment.
Figure 10:
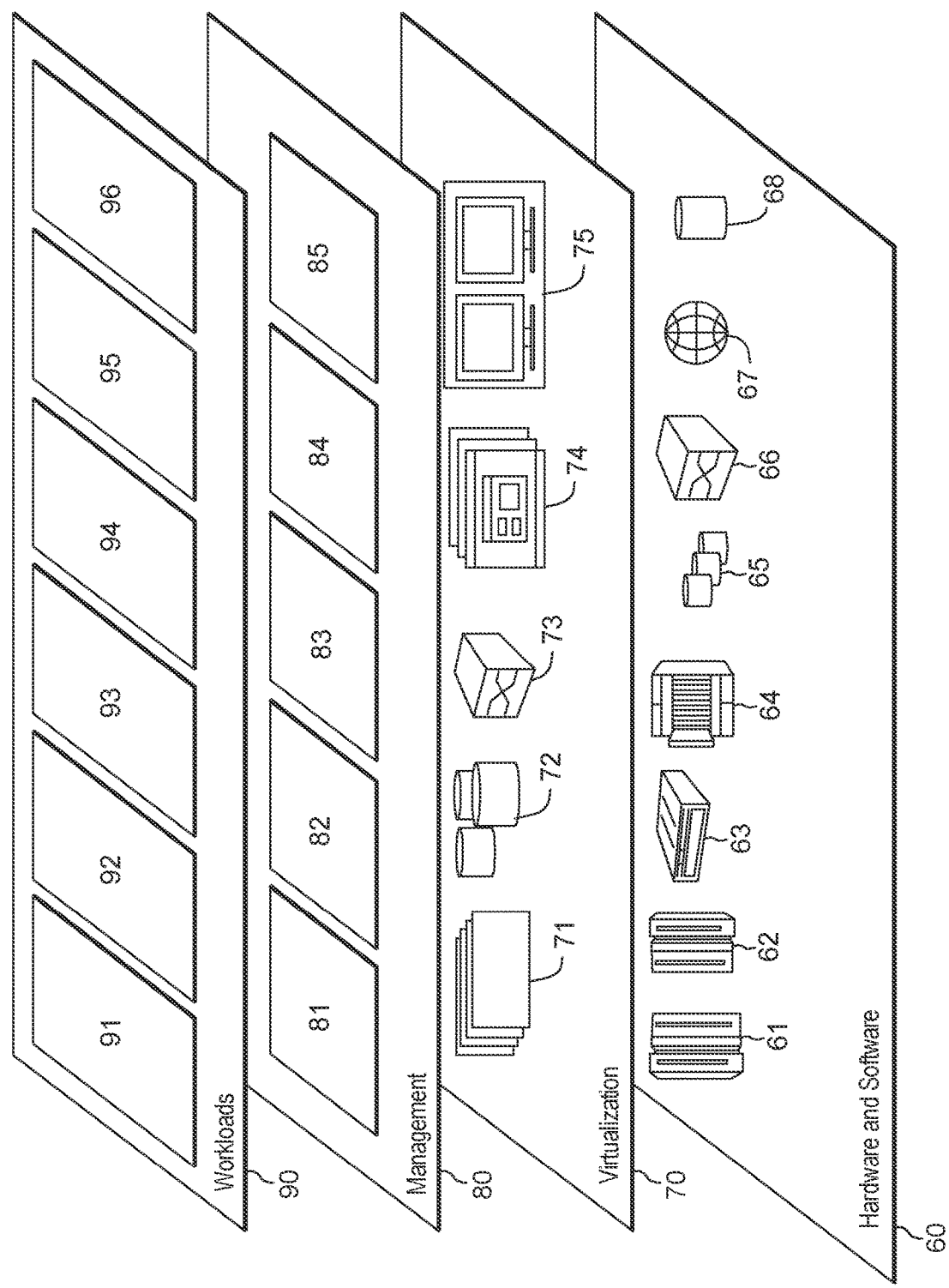
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, system 1000 can include one or more computing node 10 and can include one or more program 40 for performing functions described with reference VM 220 of the flowchart of FIGS. 3A-3B. In one embodiment, system 1000 can include one or more computing node 10 and can include one or more program 40 for performing functions described with reference VM 120 of the flowchart of FIGS. 3A-3B. In one embodiment, system 1000 can include one or more computing node 10 and can include one or more program 40 for performing functions described with reference NSMF 260 of the flowchart of FIGS. 3A-3B. In one embodiment, UE device 10A can include one or more computing node 10 and can include one or more program 40 for performing functions described with reference to UE device 10A of the flowchart of FIGS. 3A-3B. In one embodiment, the computing node based systems and devices depicted in FIGS. 1A-1C can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for running of an IVR session as set forth herein. The processing components 96 can be implemented with use of one or more program 40 described in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
obtaining output data from a user equipment device associated to a user, wherein the output data from the user equipment device includes voice data of the user;
generating, during an interactive voice response session, vocal response data for presentment by a virtual agent to the user in response to the voice data, wherein the generating includes performing data access queries on one or more storage system; and
prioritizing certain asset data of the one or more storage system, wherein the prioritizing is performed in dependence on data of the output data, wherein the one or more storage system includes a first storage system disposed in an edge computing environment local to a computing node performing the generating and a second storage system disposed in a core computing environment remote from the first storage system, wherein the prioritizing certain asset data of the one or more storage system includes iteratively receiving, during the interactive voice response session, iterations of the certain asset data from the second storage system for storage caching into the first storage system in dependence on the data of the output data.

2. The computer implemented method of claim 1, wherein the method includes iteratively subjecting assets of the one or more storage system to natural language processing to tag respective assets of the one or more storage system with topic tags for inclusion in a data structure in which the topic tags are associated to asset identifiers, wherein the method includes subjecting the output data to processing to return topic scoring data that specifies a predicted likelihood of a set of topics being present in the interactive voice response session subsequent to a current time, and selecting the certain asset data using the topic scoring data to identify assets specified within the data structure in which the topic tags are associated to asset identifiers.

3. The computer implemented method of claim 1, wherein the method includes selecting a network slice for accommodation of data traffic from the core computing environment to the edge computing environment in dependence on information of the output data, wherein the prioritizing certain asset data of the one or more storage system includes iteratively receiving, during the interactive voice response session, the certain asset data over the network slice from the second storage system for storage caching into the first storage system in dependence on the data of the output data, the network slice being configured for persistent delivery of a set of key performance indicators, the set of performance indicators defined by a set of slice parameter values, the set of slice parameter values including a bandwidth parameter value, a user plane latency parameter value, a reliability parameter value, an availability parameter value, and a security parameter value.

4. The computer implemented method of claim 1, wherein the method includes selecting a first network slice for accommodation of data traffic from the core computing environment to the edge computing environment in dependence on information of the output data, and selecting a second network slice for accommodation of data traffic from the user equipment device to the computing node in dependence on output information of the output data, wherein the prioritizing certain asset data of the one or more storage system includes iteratively receiving, during the interactive voice response session, iterations of the certain asset data over the first network slice from the second storage system for storage caching into the first storage system in dependence on the data of the output data, wherein the method further includes receiving the output data from the user equipment device over the second network slice, the first network slice being configured for persistent delivery of a first set of performance indicators defined by a first set of slice parameter values, the first set of slice parameter values including a first bandwidth parameter value and a first user plane latency parameter value, the second network slice being configured for persistent delivery of a second set of performance indicators defined by a second set of slice parameter values, the second set of slice parameter values including a second bandwidth parameter value and a second user plane latency parameter value.

5. The computer implemented method of claim 1, wherein at least one of the one or more storage system is a tiered storage system having a first tier and a second tier, the second tier lower than the first tier, wherein the prioritizing certain asset data includes moving the certain asset data to the first tier and moving particular asset data of the one or more storage system to the second tier, in dependence on the data of the output data.

6. The computer implemented method of claim 1, wherein prioritizing asset data includes assigning the certain asset data to a first search priority and assigning particular asset data to a second search priority, in dependence on the data of the output data, so that the certain asset data is searched prior to the particular asset data, wherein the assigning the certain asset data to the first search priority includes moving the first data to a first storage volume and setting the first storage volume to a first search priority, wherein the assigning the particular asset data to the second search priority includes moving the particular asset data to a second storage volume and setting the second storage volume to a second search priority.

7. The computer implemented method of claim 1, wherein the method includes subjecting the voice data to processing using natural language processing (NLP) to provide extracted topics extracted from the voice data, and wherein the prioritizing certain asset data is performed in dependence on the extracted topics.

8. The computer implemented method of claim 1, wherein the method includes subjecting the voice data to processing using natural language processing (NLP) to provide extracted topics extracted from the voice data, wherein the method includes using the extracted topics for scoring a set of candidate topics, and wherein the method includes examining a decision data structure that associates asset identifiers to topic tags, wherein the prioritizing certain asset data of the one or more storage system is performed in dependence on the scoring and the examining, wherein prioritizing asset data includes assigning the certain asset data to a first search priority and assigning particular asset data to a second search priority, in dependence on the data of the output data, so that the certain asset data is searched prior to the particular asset data.

9. The computer implemented method of claim 1, wherein the method includes subjecting the voice data to processing to identify a time period of interest and examining, using the time period of interest, a data structure that associates asset identifiers to timestamps to identify specified timestamped assets associated to the time period of interest, wherein the method includes selecting the certain asset data to include data of the specified timestamped assets.

10. The computer implemented method of claim 1, wherein the method includes subjecting the voice data to processing to identify a time period of interest and examining, using the time period of interest, a data structure that associates asset identifiers to timestamps to identify timestamped assets associated to the time period of interest, wherein the method includes selecting the certain asset data to include data of the timestamped assets, wherein the one or more storage system includes a first storage system local to a computing node performing the generating and a second storage system remote from the first storage system wherein at least one of the one or more storage system is a tiered storage system having a first tier and a second tier, the second tier lower than the first tier, wherein the prioritizing certain asset data includes moving the certain asset data to the first tier and moving particular asset data to the second tier, in dependence on the data of the output data, wherein prioritizing asset data includes assigning the certain asset data to a first search priority and assigning particular asset data to a second search priority, in dependence on the data of the output data, so that the certain asset data is searched prior to the particular asset data, wherein the assigning the certain asset data to the first search priority includes setting the first tier to a first search priority, wherein the assigning the particular asset data to a second search priority includes setting the second tier to a second search priority.

11. The computer implemented method of claim 1, wherein the prioritizing is performed in dependence on the voice data, and wherein the method includes iteratively performing the obtaining, the generating and prioritizing during the interactive voice response session so that iterations of the certain asset data subject to prioritizing are selected in dependence on changes in the voice data.

12. The computer implemented method of claim 1, wherein the prioritizing is performed in dependence on the voice data, and wherein the method includes iteratively performing the obtaining, the generating and prioritizing during the interactive voice response session so that iterations of the certain asset data subject to prioritizing is dynamically changed in dependence on changes in the voice data, wherein at least one of the one or more storage system is a tiered storage system having a first tier and a second tier, the second tier lower than the first tier, wherein the prioritizing certain asset data includes moving the certain asset data to the first tier and moving particular asset data to the second tier, in dependence on the data of the output data, wherein prioritizing asset data includes assigning the certain asset data to a first search priority and assigning particular asset data to a second search priority, in dependence on the data of the output data, so that the certain asset data is searched prior to the particular asset data, wherein the assigning the certain asset data to the first search priority includes setting the first tier to a first search priority, wherein the assigning the particular asset data to a second search priority includes setting the second tier to a second search priority.

13. The computer implemented method of claim 1, wherein the prioritizing is performed in dependence on health biometric sensor output data of the output data, and wherein the method includes iteratively performing the obtaining, the generating and prioritizing during the interactive voice response session so that iterations of the certain asset data subject to prioritizing are selected in dependence on changes in the health biometric sensor output data during the interactive voice response session.

14. The computer implemented method of claim 1, wherein the prioritizing is performed in dependence on environmental condition sensor output data of the output data indicating environmental conditions of the user, and wherein the method includes iteratively performing the obtaining, the generating and prioritizing during the interactive voice response session so that iterations of the certain asset data subject to prioritizing are selected in dependence on changes in the environmental condition sensor output data during the interactive voice response session.

15. The computer implemented method of claim 1, wherein the method includes using the voice data as well as location sensor output data, health biometric sensor output data, and environmental condition sensor output data from the user equipment device to assign scoring values to a set of topics, wherein a scoring value assigned to a topic provides a prediction as to a likelihood of the topic being observed subsequently to a current time in the interactive voice response session, wherein the method includes selecting the certain asset data using the scoring value, wherein at least one of the one or more storage system is a tiered storage system having a first tier and a second tier, the second tier lower than the first tier, wherein the prioritizing certain asset data includes moving the certain asset data to the first tier and moving particular asset data to the second tier, in dependence on the data of the output data, wherein prioritizing asset data includes assigning the certain asset data to a first search priority and assigning particular asset data to a second search priority, in dependence on the data of the output data, so that the certain asset data is searched prior to the particular asset data, wherein the assigning the certain asset data to the first search priority includes setting the first tier to a first search priority, wherein the assigning the particular asset data to a second search priority includes setting the second tier to a second search priority.

16. The computer implemented method of claim 1, wherein the method includes iteratively subjecting assets of the one or more storage system to natural language processing to tag respective assets of the one or more storage system with topic tags, processing output sensor data of the output data to provide extracted topic data from the interactive voice response session, and selecting the certain data using the topic tags and the extracted topic data.

17. A system comprising:
a memory;
at least one processor in communication with the memory; and
program instructions executable by one or more processor via the memory to perform a method comprising:
obtaining output data from a user equipment device associated to a user, wherein the output data from the user equipment device includes voice data of the user;
generating, during an interactive voice response session, vocal response data for presentment by a virtual agent to the user in response to the voice data, wherein the generating includes performing data access queries on one or more storage system; and
prioritizing certain asset data of the one or more storage system, wherein the prioritizing is performed in dependence on data of the output data, wherein the one or more storage system includes a first storage system disposed in an edge computing environment local to a computing node performing the generating and a second storage system disposed in a core computing environment remote from the first storage system, wherein the prioritizing certain asset data of the one or more storage system includes iteratively receiving, during the interactive voice response session, iterations of the certain asset data from the second storage system for storage caching into the first storage system in dependence on the data of the output data.

18. A computer implemented method comprising:
obtaining output data from a user equipment device of a user, wherein the output data includes voice data of the user;
providing network slice selection data in dependence on data of the output data; and
generating during an interactive voice response session in response to the voice data, vocal response data for presentment to the user by a virtual agent, wherein the generating includes using data traffic received over one or more network slice operating according to the network slice selection data, and wherein the generating includes performing data access queries on one or more storage system.

19. The computer implemented method of claim 18, wherein the one or more storage system includes a first storage system disposed in an edge computing environment local to a computing node performing the generating and a second storage system disposed in a core computing environment remote from the first storage system, wherein the network slice selection data includes selection data for selecting a first network slice for accommodating first traffic from the second storage system for storage caching into the first storage system, wherein the network slice selection data includes selection data for selecting a second network slice for accommodating second traffic from the user equipment device to the computing node, wherein the generating of the vocal response data includes using data of the first traffic and data of the second traffic.

20. The computer implemented method of claim 18, wherein the one or more storage system includes a first storage system disposed in an edge computing environment local to a computing node performing the generating and a second storage system disposed in a core computing environment remote from the first storage system, wherein the network slice selection data includes selection data for selecting a network slice for accommodation of traffic from the core computing environment to the edge computing environment, wherein the method includes iteratively receiving, during the interactive voice response session, iterations of certain asset data over the network slice from the second storage system for storage caching into the first storage system, the network slice being configured for persistent delivery of a set of key performance indicators defined by a set of slice parameter values, the set of slice parameter values including a bandwidth parameter value and a user plane latency parameter value.

21. The computer implemented method of claim 18, wherein generating is performed by a computing node that receives first traffic from the user equipment device, wherein the method includes processing the voice data to provide extracted topics associated to the voice data, examining a decision data structure data that associates topics to sensitivity level, determining that sensitivity level of the interactive voice response session has exceeded a threshold based on the examining and based on the determining performing the providing the network slice selection data so that the network slice selection data includes network slice selection data to transition the first traffic from a first network slice to a second network slice, the second network slice having a higher security level parameter value than the first network slice.

22. A system comprising:
a memory;
  at least one processor in communication with the memory; and
  program instructions executable by one or more processor via the memory to perform a method comprising:
   obtaining output data from a user equipment device of a user, wherein the output data includes voice data of the user;
   providing network slice selection data in dependence on data of the output data; and
   generating in response to the voice data, during an interactive voice response session, vocal response data for presentment to the user by a virtual agent, wherein the generating includes using data traffic received over one or more network slice operating according to the network slice selection data, and wherein the generating includes performing data access queries on one or more storage system.

23. A computer implemented method comprising:
  obtaining output data from a user equipment device associated to a user, wherein the output data from the user equipment device includes voice data of the user;
  generating, during an interactive voice response session, vocal response data for presentment by a virtual agent to the user in response to the voice data, wherein the generating includes performing data access queries on one or more storage system; and
  prioritizing certain asset data of the one or more storage system, wherein the prioritizing is performed in dependence on data of the output data, wherein the one or more storage system includes a first storage system local to a computing node performing the generating and a second storage system remote from the first storage system, wherein the prioritizing certain asset data of the one or more storage system includes iteratively receiving, during the interactive voice response session, iterations of the certain asset data from the second storage system for storage caching into the first storage system in dependence on the data of the output data.

24. The computer implemented method of claim 23, wherein at least one of the one or more storage system is a tiered storage system having a first tier and a second tier, the second tier lower than the first tier, wherein the prioritizing certain asset data includes moving the certain asset data to the first tier and moving particular asset data of the one or more storage system to the second tier, in dependence on the data of the output data.

25. The computer implemented method of claim 23, wherein the method includes subjecting the voice data to processing using natural language processing (NLP) to provide extracted topics extracted from the voice data, and wherein the prioritizing certain asset data is performed in dependence on the extracted topics.

* * * * *